(12) United States Patent
Kurematsu et al.

(10) Patent No.: US 8,110,128 B2
(45) Date of Patent: Feb. 7, 2012

(54) METHOD OF MANUFACTURING AN ANTI-GLARE ANTI-REFLECTION FILM

(75) Inventors: Masayuki Kurematsu, Hachioji (JP); Toshiaki Shibue, Hino (JP); Sota Kawakami, Sagamihara (JP); Katsumi Maejima, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 873 days.

(21) Appl. No.: 11/992,180

(22) PCT Filed: Sep. 13, 2006

(86) PCT No.: PCT/JP2006/318109
§ 371 (c)(1),
(2), (4) Date: Mar. 18, 2008

(87) PCT Pub. No.: WO2007/034715
PCT Pub. Date: Mar. 29, 2007

(65) Prior Publication Data
US 2010/0062217 A1    Mar. 11, 2010

(30) Foreign Application Priority Data
Sep. 21, 2005  (JP) .................................. 2005-273190

(51) Int. Cl.
*B29D 11/00*    (2006.01)
(52) U.S. Cl. ........... 264/1.6; 264/1.7; 264/2.7; 427/162; 427/164
(58) Field of Classification Search .................. 264/1.31, 264/1.34, 1.6, 1.7, 2.7, 129; 427/162, 164, 427/163.1, 163.3
See application file for complete search history.

(56) References Cited

U.S. PATENT DOCUMENTS

| 6,716,513 B1 * | 4/2004 | Hasuo et al. | .................. 428/141 |
| 7,427,371 B2 * | 9/2008 | Kawanishi et al. | ............ 264/2.5 |
| 2003/0234460 A1 | 12/2003 | Hayashi et al. | |
| 2004/0160673 A1 | 8/2004 | Se et al. | |

FOREIGN PATENT DOCUMENTS

| JP | 2000-193804 A | 7/2000 |
| JP | 2001-264508 A | 9/2001 |
| JP | 2002-082207 A | 3/2002 |
| JP | 2003-248101 A | 9/2003 |
| JP | 2004-029240 A | 1/2004 |
| JP | 2003/121620 A | 4/2004 |
| JP | 2004-144934 A | 5/2004 |
| JP | 2004-230614 A | 8/2004 |
| JP | 2005-084113 A | 3/2005 |
| JP | 2005-156642 A | 6/2005 |

* cited by examiner

*Primary Examiner* — Mathieu D. Vargot
(74) *Attorney, Agent, or Firm* — Holtz, Holtz, Goodman & Chick, PC

(57) ABSTRACT

Disclosed is an anti-glare anti-reflection film having a low haze and reduced in unevenness and dazzle. The film contains a thermoplastic resin film and at least a hard coat layer and an anti-reflection layer provided on a first surface of the thermoplastic resin film. In the film, a first convexoconcave structure that can give an anti-glare property is provided on the first surface of the thermoplastic resin film or the surface of a layer provided on the first surface of the thermoplastic resin film, and a second convexoconcave structure that can give an anti-glare property is provided on a second surface which is the other surface of the thermoplastic resin film or the surface of a layer provided on the second surface of the thermoplastic resin film. The anti-glare anti-reflection film has an average film thickness of 20 to 70 μm.

6 Claims, 4 Drawing Sheets

BL-1

BL-8

LARGE CONVEXOCONCAVE   SMALL CONVEXOCONCAVE

SMALL CONVEXOCONCAVE   LARGE CONVEXOCONCAVE

FIG. 5 (A)
FIG. 5 (B)
FIG. 5 (C)
FIG. 6
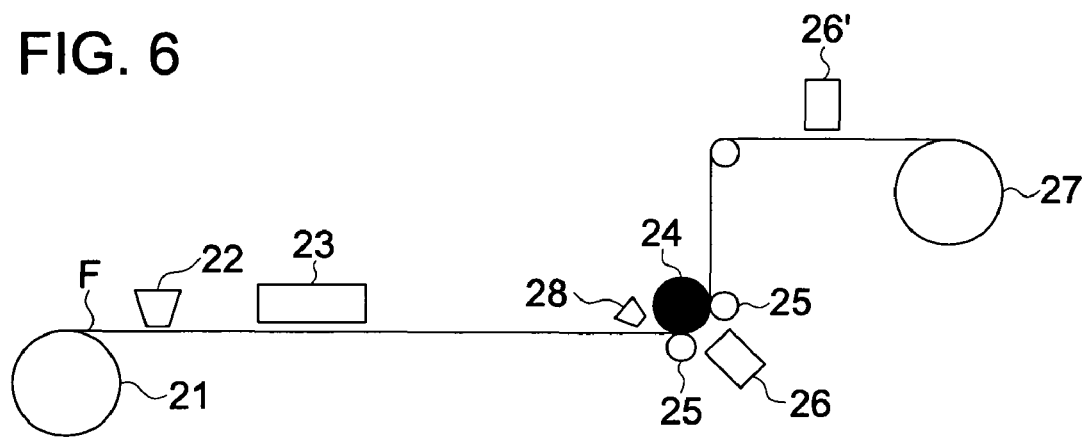
FIG. 7
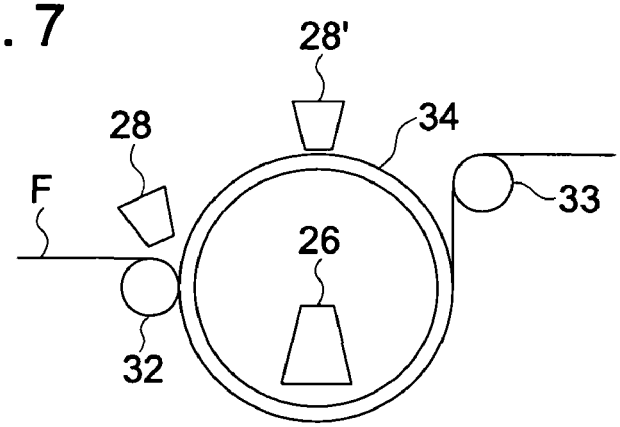

METHOD OF MANUFACTURING AN ANTI-GLARE ANTI-REFLECTION FILM

This application is the U.S. national phase application of International Application PCT/JP2006/318109 filed Sep. 13, 2006.

FIELD OF THE INVENTION

The present invention relates to an anti-glare anti-reflection film and a method for producing the anti-glare anti-reflection film.

BACKGROUND OF THE INVENTION

Anti-glare anti-reflection film is generally constituted by providing a hard-coat layer containing anti-glare particles on a smooth support and further providing an anti-reflection layer on the hard-coat layer(for example, Patent Documents 1 and 2).

Recently, the anti-glare anti-reflection film for flat panel displays, particularly large screen television displays, is expected to have reduced haze so as not to darken the displaying image. However, increasing in the adding amount of particle for making sufficient anti-glare ability inevitably raises the haze.

Therefore, use of a film having anti-glare ability given by forming convexoconcave on the surface thereof, without use of any particle, is preferred from the viewpoint of the haze (for example, Patent Documents 3 and 4).

However, the anti-glare anti-reflection film prepared by giving the convexoconcave on the surface thereof causes a problem that unevenness extended on a wide area tends to be formed. Moreover, the anti-glare anti-reflection film has a problem of glaring, and Patent Documents 5 to 10 are proposed for solving the problem of glaring, but the problem is not sufficiently solved and further improvement is demanded.

Patent Document 1: Japanese Patent Application Publication (hereinafter referred to as JP-A) No. 2001-264508
Patent Document 2: JP-A No. 2003-121620
Patent Document 3: JP-A No. 2004-230614
Patent Document 4: JP-A No. 2005-84113
Patent Document 5: JP-A No. 2000-193804
Patent Document 6: JP-A No. 2002-82207
Patent Document 7: JP-A No. 2003-248101
Patent Document 8: JP-A No. 2004-29240
Patent Document 9: JP-A No. 2004-144934
Patent Document 10: JP-A No. 2005-156642

DISCLOSURE OF THE INVENTION

Problems to be Solved by the Invention

An object of the present invention is to provide an anti-glare anti-reflection film exhibiting a low haze, and reduced unevenness and glare, and to provide a method of manufacturing the anti-glare anti-reflection film.

Means to Solve the Problems

The above object of the present invention is achieved by the following structures.

(1) An anti-glare anti-reflection film comprising a thermoplastic resin film having at least a hard coat layer and an anti-reflection layer on a first surface of the thermoplastic resin film, wherein
  a first convexoconcave structure which gives an anti-glare property is provided on the first surface or on a layer provided on the first surface;
  a second convexoconcave structure which gives the anti-glare property is provided on a second surface or on a layer provided on the second surface of the thermoplastic resin film, the second surface being a surface of the thermoplastic resin film opposite to the first surface; and
  an average total thickness of the anti-glare anti-reflection film is 20 to 70 μm.

(2) The anti-glare anti-reflection film of Item (1), wherein
  the hard coat layer and the anti-reflection layer are provided in that order on the first surface of the thermoplastic resin film; and
  the first convexoconcave structure is given on the first surface or on a surface of the hard coat layer.

(3) The anti-glare anti-reflection film of Item (2), wherein
  the first convexoconcave structure is given on the first surface of the thermoplastic resin film.

(4) The anti-glare anti-reflection film of any one of Items (1) to (3), wherein
  the second convexoconcave structure is given on the second surface of the thermoplastic resin film.

(5) The anti-glare anti-reflection film of any one of Items (1) to (4), wherein
  a surface roughness (Ra) of a surface having the first convexoconcave structure is different from a surface roughness (Ra) of a surface having the second convexoconcave structure.

(6) The anti-glare anti-reflection film of Items (5), wherein
  the surface roughness of the surface having the second convexoconcave structure (Ra)b is ⅕ to ⅓ of the surface roughness of the surface having the first convexoconcave structure (Ra)a.

(7) The anti-glare anti-reflection film of any one of Items (1) to (6), wherein
  substantially no particles which give the anti-glare property are contained in the thermoplastic resin film and in the hard coat layer.

(8) A method of manufacturing an anti-glare anti-reflection film comprising the steps of:
  providing a hard coat layer on a first surface of a thermoplastic resin film; and
  providing an anti-reflection layer on the hard coat layer, wherein
  the method further comprises the steps of:
    providing a first convexoconcave structure which gives an anti-glare property on the first surface of the thermoplastic resin film or on a layer provided on the first surface; and
    providing a second convexoconcave structure which gives the anti-glare property on the second surface of the thermoplastic resin film or on a layer provided on the second surface, the second surface being a surface of the thermoplastic resin film opposite to the first surface, wherein
    an average total thickness of the anti-glare anti-reflection film is 20 to 70 μm.

(9) The method of Item (8), wherein
  the step providing the first convexoconcave structure and the step providing the second convexoconcave structure are each carried out by embossing with a roller having a convexoconcave structure.

(10) The method of Item (8) or (9), wherein
  the hard coat layer and the anti-reflection layer are provided on the first surface of the thermoplastic resin film; and the step of providing the first convexoconcave structure is carried out before the step of providing the hard coat layer.

(11) The method of Item (8) or (9), wherein
the hard coat layer and the anti-reflection layer are provided on the first surface of the thermoplastic resin film; and
the step of providing the first convexoconcave structure is carried out between the step of providing the hard coat layer and the step of providing the anti-reflection layer on the hard coat layer.

(12) The method of Item (9), wherein
a convexoconcave structure of a convexoconcave roller used to provide the first convexoconcave structure is formed by using a metallic material or a ceramic material; and
a convexoconcave structure of a convexoconcave roller used to provide the second convexoconcave structure is formed by using a rubber material.

(13) The method of Item (9), wherein
a convexoconcave structure of a convexoconcave roller used to provide the first convexoconcave structure is formed by using a rubber material; and
a convexoconcave structure of a convexoconcave roller used to provide the second convexoconcave structure is formed by using a metallic material or a ceramic material.

Effects of the Invention

An anti-glare anti-reflection film exhibiting a low haze, and reduced unevenness and glare; and a method of manufacturing the anti-glare anti-reflection film can be provided by the present invention.

BRIEF DESCRIPTION OF THE DRAWINGS

FIGS. 5(A) to 5(C) each show a preferable convexoconcave patterns of the present invention.

FIG. 6 shows a schematic drawing of a convexoconcave forming apparatus using a convexoconcave roller for giving the convexoconcave on the hard coat layer of the present invention.

FIG. 7 shows a schematic drawing of another convexoconcave forming apparatus using a convexoconcave roller for forming the convexoconcave on the hard coat layer of the present invention.

DESCRIPTION OF THE SYMBOLS

Figure 1:
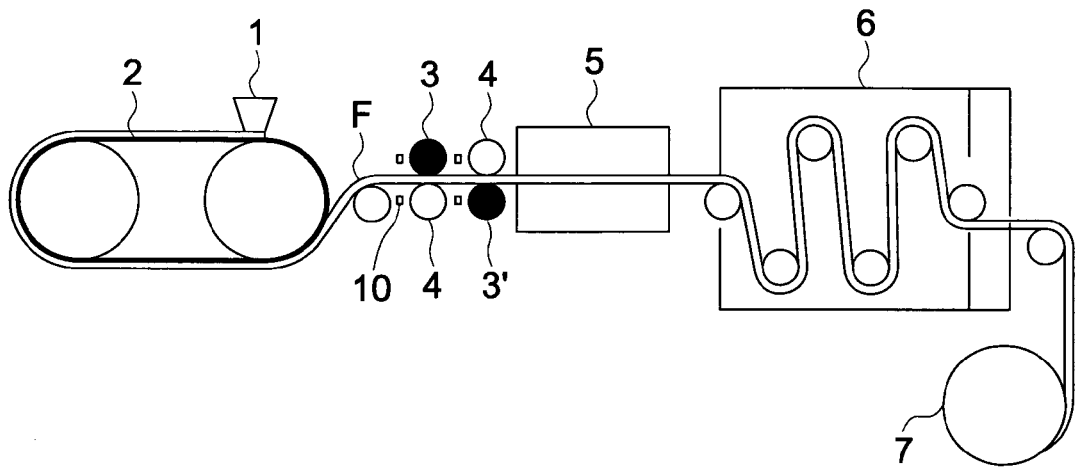
FIG. 1 shows a schematic drawing of a convexoconcave surface forming apparatus relating to the invention using a convexoconcave roller.

F: Film
1: Die
2: Casting belt
3, 3': Convexoconcave roller
4: Back roller
5: Tenter
6: Film drying apparatus
7: Winder roll
10: Static electricity elimination device
21: Feeding roll
22: Die
23: Film drying apparatus
24: Convexoconcave roller
25: Back roller
26, 26': Curing apparatus
27: Winding roll
28, 28': Gas nozzle
32: Nip roller
33: Peeling roller
34: Hollow roller
G: Discharging gas
G': Excited discharging gas
P: Liquid transfer pump
130: Atmospheric pressure plasma discharging treatment apparatus
131: Atmospheric pressure plasma discharging treatment chamber
132: Discharging space
135: Roller electrode (First electrode)
136: Square tube shaped electrode group (Second electrode)
140: Electric field applying means
141: First power source
142: Second power source
143: First filter
144: Second filter
150: Gas supplying means
151: Gas generation apparatus
152: Gas supplying duct
153: Gas exhausting duct
160: Electrode temperature controlling means
161: Piping
164 and 167: Guide roller
165 and 166: Nip roller
168 and 169: Partition plate

PREFERRED EMBODIMENT OF THE INVENTION

The best embodiment for embodying the invention is described below but the invention is not limited thereto.

The anti-glare anti-reflection film of the present invention is characterized in that the film has a hard-coat layer and an anti-reflection layer provided on a thermoplastic resin film and the first convexoconcave structure for giving the anti-glare ability is provided on the first surface of the thermoplastic resin film or on a layer formed on the first surface of the thermoplastic resin film, and the second convexoconcave structure for giving the anti-glare ability is provided on the second surface, or the surface opposite the first surface, of the thermoplastic resin film or on a layer formed on the second surface of the thermoplastic resin film, and the average total thickness of the anti-glare anti-reflection film is within the range of from 20 to 70 μm.

The problems of unevenness and glaring are not solved in the investigation on various shapes of the convexoconcave by the inventors, and it is found in the further investigation that the unevenness and glaring can be prevented by convexoconcave patterns formed on the backside of a thin film, which is different from that formed on the viewing side. It is cleared that such the effects can be obtained when the average thickness of the anti-glare anti-reflection film is not more than 70 μm and the effect on the unevenness is insufficient when the thickness is less than 20 μm which may be caused by problems regarding the production process.

In the present invention, the convexoconcave pattern formed on the backside contributes on the anti-glare effect and the unevenness is observed depending on the viewing direction when the layer is thick but such the problem may be solved when the thickness is not more than 70 μm. Moreover, it is cleared that the unevenness is further preferably reduced when the convexoconcave patterns formed on the convexoconcave surfaces are different from each other in the size thereof. The difference of the size of the convexoconcave pattern can be evaluated by comparing the surface roughness Ra.

The present invention is described in detail below. In the anti-glare anti-reflection film of the present invention, the problems of unevenness and glaring are solved by providing the convexoconcave patterns (also referred to as embossing) not only on the one side of the film but also on the other surface.

The processing for roughening the first surface side, also referred to as viewing side, of the anti-glare anti-reflection film can be selected from the processing on the thermoplastic resin film, processing on the hard-coat layer and processing on the anti-reflection film after coating of the anti-reflection layer. However, the processing on the thermoplastic resin film or the hard-coat layer is preferable in the present invention since the processing on the anti-reflection film tends to cause breaking through the anti-reflection layer by the projected portion of the convexoconcave pattern and deformation of the anti-reflection layer so that the anti-reflection effect is spoiled.

The processing for roughening on the second surface side, also referred to as the backside, may be any of the processing on the thermoplastic resin film, processing on the hard-coat layer and processing on the anti-reflection film after coating of the anti-reflection layer without any limitation and can be optionally decided considering the suitability and efficiency for the production. In the present invention, the convexoconcave on the back side is preferably applied at the near or same time of the processing on the viewing side of the thermoplastic resin film or the hard-coat layer thereon.

As the shape of convexoconcave pattern in the present invention, a structure selected from shapes of circular cone, oblique circular cone, pyramid, oblique pyramid, wedge, concave polygonal, hemisphere and that partially having one of such the shapes are cited. In the present invention, the hemisphere shape is not always necessary true hemisphere shape and includes an oval hemisphere shape and a further modified concave shape. A shape of prism, lenticular lens and Fresnel lens each formed by linearly prolongation of the ridgeline of the convexoconcave pattern are also applicable. The slope between the ridgeline and the valley face may be a plane shape, a curved shape or a composite shape thereof.

The surface roughness (Ra)a of the first convexoconcave surface and that (Ra)b of the second convexoconcave surface are preferably different from each other. The surface roughness can be considered as an indicator of the shape and size of the convexoconcave pattern provided on each of the surface. It is cleared that that the anti-glare ability is lowered and unevenness is caused sometimes by interference caused by overlapping the convexoconcave patterns when the structure and the size of the convexoconcave patters on the both surfaces are the same. The roughness (Ra)a of the surface having the first convexoconcave structure is preferably within the range of from 0.3 to 2.0 μm, and more preferably from 0.3 to 1.0. The roughness (Ra)b of the surface having the second convexoconcave structure is preferably within the range of from ⅕ to ¾ of (Ra)a. When the roughness (Ra)a of the surface having the first convexoconcave structure is less than 0.3 μm, the anti-glare ability is weak, and when (Ra)a is less than 2.0 μm, preferable anti-glare effect can be obtained within the range in which an impression of excessive roughness is not given. It is preferable for obtaining the effects of the present invention that the roughness (Ra)b of the surface having the second convexoconcave pattern is smaller than the roughness (Ra)a of the surface having the first convexoconcave patterns and the range of the preferable surface roughness is as above-mentioned. The surface roughness (Ra) can be measured according to JIS B 0601.

The cycle of the convexoconcave patterns is preferably about from 1 μm to 100 μm from the viewpoint of prevention of moire and brightness unevenness when the film is used for a liquid crystal display for example, though the cycle is not specifically limited.

As examples the method for forming the convexoconcave pattern, the followings can be cited.

(1) A method in which the convexoconcave patterns are formed by a roller or plate on which the negative patterns of the objective convexoconcave patters are formed.

(2) A method in which thermally curable resin is charged on a mold having a roller or plate on which the negative patterns of the objective convexoconcave patterns are formed and peeled after curing by heating.

(3) A method in which UV ray or electron beam curable resin is coated on a roller or palate on which the negative patterns of the objective convexoconcave pattern are formed and covered by a transparent substrate film and then irradiated by UV ray or electron beam and the cured resin layer is peeled from the negative mold together with the film adhering with the resin layer.

(4) A solution cast method in which the negative patterns of the objective convexoconcave patterns are formed on a casting belt so that the patterns are formed on the film on the occasion of casting.

(5) A method in which the patterns of heat or photo curable resin are printed on the transparent substrate by relief printing and the resin is cured by heat or light to form the convexoconcave patterns.

(6) A method in which the patterns of heat or photo curable resin are printed on the transparent substrate by ink-jet printing and the resin is cured by heat or light to form the convexoconcave patterns.

(7) A method in which the surface is processed by a machine tool.

(8) A method in which particles having various shape such as sphere and polygon are pushed into the substrate so that the particle is half buried in the substrate and unified to give roughness to the surface of the substrate.

(9) A method in which a dispersion prepared by dispersing particles having various shape such as sphere and polygon in a small amount of a binder is coated on the substrate to give roughness to the surface of the substrate.

(10) A method in which a binder is coated on the substrate surface and particles having various shape such as sphere and polygon are sprayed to give roughness to the surface of the substrate.

First, the method for forming the convexoconcave patterns on the front or back surface of the film by pressing a roller having the patterns thereon as a mold to the film in the film forming process of the thermoplastic rein film is described referring the drawings.

As the mold, the convexoconcave roller on the surface of which the patterns to be embossed are provided is cited and plate-shaped, film-shaped and belt-shaped molds are also usable.

FIG. 1 is schematic drawing of a convexoconcave pattern forming apparatus (BL-1) relating to the present invention using the convexoconcave roller. A preliminarily prepared thermoplastic resin solution is cast on a casting belt 2 through a die 1 for forming thermoplastic resin film F (the film containing a solvent cast on the metal support is also referred to as web), the formed film is peeled and passed through a static electricity eliminating apparatus 10 for eliminating static electricity and then the convexoconcave pattern are formed on the thermoplastic resin film F by the convexoconcave roller having the pattern to be embossed 3' and a back-roller 4. After that, the web is stretched by a tenter 5 and dried in the film drying apparatus 6 and wound up by a winding roller 7.

When the convexoconcave surface is formed at the position shown in the drawing, the residual solvent content in the web is usually from 20 to 180% by mass since the web is just after the peeling. In the present invention, the residual solvent content is preferably from 60 to 150%, and specifically preferably from 80 to 140%, by mass.

The residual solvent content applied in the present invention is represented by the following expression.

Residual solvent content (mass %){$(M–N)/N$}×100

In the above, M is the mass of web at an optional time and N is the mass of the web after drying for 3 hours at 110° C.

The roughening may be carried out after the tenter, in the drying apparatus 6 in FIG. 1 or after the drying. The roughening may be carried out by using plural pairs of convexoconcave rollers and the back-rollers, although, in the figure, one pair of a convexoconcave roller and a back-roller is used to the front side and back side of the film.

Figure 2:
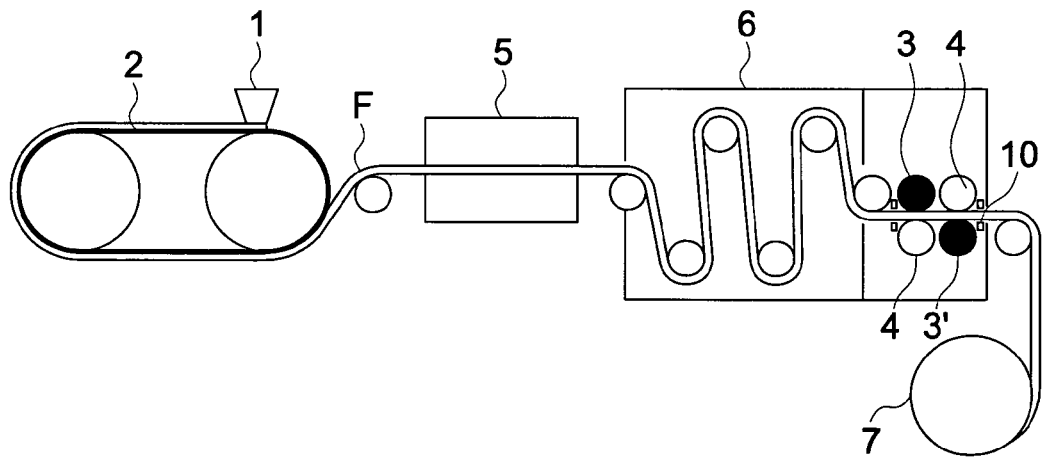
FIG. 2 shows a schematic drawing of the convexoconcave forming apparatus in a drying zone.

FIG. 2 shows the schematic drawing of the roughening apparatus (BL-8) provided in the drying apparatus. In FIG. 2, the constituting elements the same as those in FIG. 1 are each represented by the same symbols, respectively, and descriptions of them are omitted. In this case, the residual solvent content in the film is considerably reduced compared to the case shown in FIG. 1. However, an advantage that the convexoconcave patterns can be formed with high precision because the surface temperature of the thermoplastic resin film can be set at a demanded value as mentioned later.

It is also possible that the film is cooled until room temperature and subjected to roughening treatment by an off-line roughening apparatus using the patterned convexoconcave roller. In such the case, the stability of the convexoconcave patterns formation is lowered when the temperature or the residual solvent content. Moreover, dangerousness of adhering of dusts and foreign matters onto the film is caused before the roughening by the convexoconcave roller. Therefore, the roughening is preferably carried out in the film production process as shown in FIGS. 1 and 2 for not only easily forming the patterns but also reducing faults.

Figure 3:
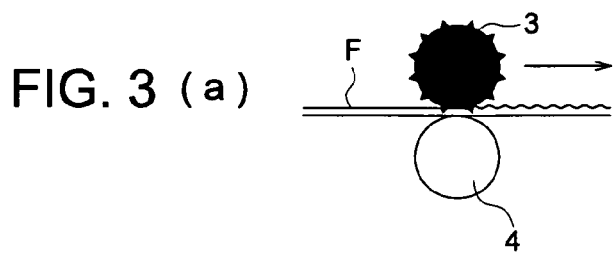
FIGS. 3(a) to 3(d) each show an enlarged drawing of the convexoconcave roller(s) for forming the convexoconcave structure and back roller(s) facing to the convexoconcave roller(s).
Figure 3:
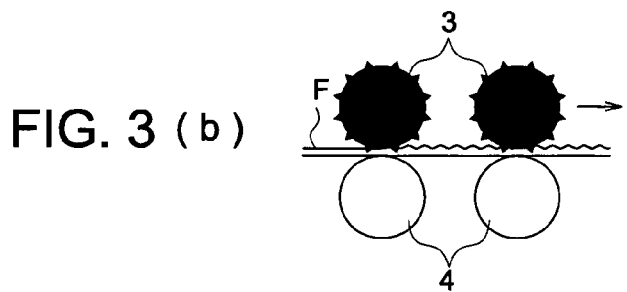
Figure 3:
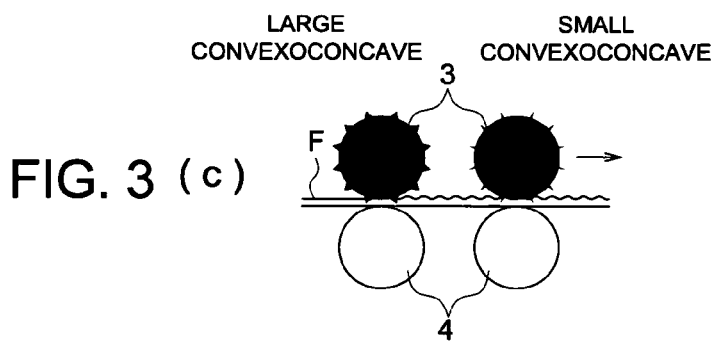
Figure 3:
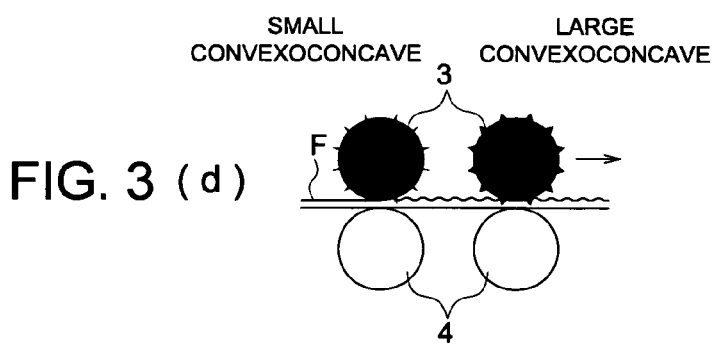

FIGS. 3(*a*) to 3(*d*) each show an enlarged drawing of the convexoconcave roller 3 or 3' for forming the convexoconcave patterns and the back-roller 4 facing to the convexoconcave roller, in which a case using single convexoconcave roller 3 or 3' and another case using plural convexoconcave rollers are shown. The convexoconcave roller in any of FIGS. 3(*a*) to 3(*d*) can be applied to both of the front side and back side of the film F. When plural convexoconcave rollers are used, the convexoconcave surface corresponding to the required anti-glare ability can be formed by combination use of a convexoconcave roller having relatively large patterns and that having relatively small patterns.

Namely, convexoconcave patterns with short cycle can be formed after formation of patterns with long cycle in the convexoconcave patterns formation process of the present invention using the convexoconcave rollers. The convexoconcave surface excellent in the anti-glare ability can be obtained by such the process. In concrete, subtle convexoconcave patterns can be formed by using two or more convexoconcave rollers at different residual solvent content in the film. Moreover, a convexoconcave surface having complex patterns can be formed by using two or more convexoconcave rollers each different in the patterns.

When the convexoconcave patterns are formed by using two or more convexoconcave rollers, the temperature of the rollers is preferably different 1 ° C. or more from each other for giving the patterns. The shape of the convexoconcave pattern can be controlled by varying the temperature. For example, the patterns giving high Ra value can be formed by raising the temperature.

As the convexoconcave roller for forming the convexoconcave surface, one having fine or coarse patterns may be suitably selected and on which projections or pits of designed shape, matted shape, lenticular lens shape or a part of sphere are regularly or randomly arranged also can be used. For example, projections or pits constituted by a part of sphere having a diameter of from 5 to 100 μm and a height of from 0.1 to 2 μm are cited and such the projections or pits may be combined with those having coarse and fine size.

As the material of the convexoconcave roller and the back-roller, metal, stainless steel, carbon steel, aluminum alloy, titanium alloy, ceramics, hard rubber, strengthen plastics and a combination thereof can be used and a metal roller is preferable from the viewpoint of strength and easiness of production. Particularly, a convexoconcave roller of stainless steel is preferable, and a convexoconcave roller made from stainless steel is more preferable since easiness for washing and durability of the roller are also important. It is particularly preferable to make the convexoconcave patterns on the viewing side by the roller of metal or ceramics material and to make those on the back side by the roller of hard rubber material. The convexoconcave patterns each subtly different in the shape (shape of mount, valley and ridgeline) from each other can be formed by the use of the convexoconcave rollers each made from different materials so that the glaring can be effectively prevented Water repellent treatment may be provided onto the surface of the roller. As a method for forming desired patterns on the convexoconcave roller, a method by etching, sandblast, mechanical processing or using a metal mold can be applied. For the back-roller, hard rubber or metal is preferably used.

Figure 4:
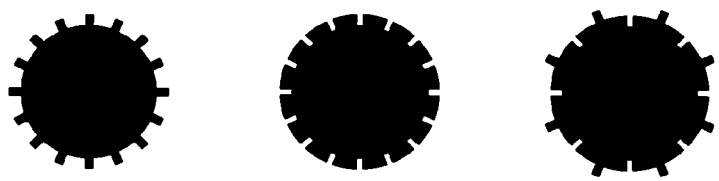
FIG. 4 shows an oblique view and an example of the shape of the cross section of the convexoconcave roller.
Figure 4:
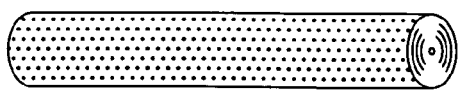

FIG. 4 shows examples of oblique and cross section of the convexoconcave roller. As shown in the drawing, the mold may have a combination of projections and pits and the shape of them may be pyramid, triangular pyramid, corn or hemisphere without any limitation, and a wavy pattern is preferably usable.

Preferable patterns of irregularity in the present invention are shown in FIGS. 5(A) to % (C).

The decentration of the convexoconcave roller and the back-roller is preferably not more than 50 μm, more preferably not more than 20 μm, and further preferably from 0 to 5 μm.

The diameter of the convexoconcave roller is preferably from 5 to 200 cm, more preferably from 10 to 100 cm, and particularly preferable from 10 to 50 cm.

In the present invention, the surface temperature T1 of the convexoconcave roller is within the range of from T2+10 to T2+55° C. and preferably from T2+30 to T2+50° C.; the above T2 is thermal deformation temperature of the thermoplastic resin. The thermal deformation temperature is a value measured according to ASTMD-648.

When the surface temperature Ti of the convexoconcave roller is lower than the thermal deformation temperature, formation of the fine projection-pit patterns is difficultly preformed. When the surface temperature T1 is higher than 55° C. or more than the thermal deformation temperature T2, the flatness of the film tends to be deteriorated. The surface temperature T1 of the convexoconcave roller can be controlled by setting the temperature of the patterned roller itself, atmosphere temperature, temperature of the film to be embossed, residual solvent content of the film and speed of the embossing. The temperature of the patterned roller itself can be controlled by circulating a temperature controlled gas or liquid medium in the roller. The temperature is selected within the range of from 40 to 300° C., and preferably from 50 to 250° C., according to the kind of the resin and the shape of the pattern to be embossed. On such occasion, it is preferable to inhibit bubble formation caused by the residual solvent, and the bubble formation can be prevented by raising the embossing speed even though the convexoconcave roller surface temperature is higher than the boiling point of the residual solvent.

The temperature of the back-roller is preferably controlled in the similarly manner and the temperature is preferably set at the same or less than that of the convexoconcave roller.

The pressure for roughening is suitably selected from the range of from 5 to 500 N/cm, and more preferably from 30 to 500 N/cm by line pressure considering the kind of thermoplastic resin, shape of the patters to be embossed and the temperature.

Preferable embodiments of the method for forming the irregular surface relating to the present invention are described below.

In the method of the present invention, it is preferable to produce anti-glare anti-reflection film by that the thermoplastic resin film is heated and roughened by two kinds of roller each having convexoconcave pattern to prepare thermoplastic film having convexoconcave patterns different from each other on the viewing sided and the backside thereof, respectively, and then coated with the hard-coat layer and the anti-reflection layer.

As the film forming process of the thermoplastic resin, a melt casting film forming method and a solution casting film forming method are applicable. In the present invention, the followings are preferable embodiments for stably forming the convexoconcave surface with high reproducibility; a method in which the convexoconcave roller is pressed onto the surface of the film heated in the production process without cooling to form the convexoconcave patterns on the surface of the film, a method in which the thermoplastic film is stretched by a tenter in the longitudinal direction before or after the formation of convexoconcave patterns by pressing a convexoconcave roller onto the front surface and another convexoconcave roller is pressed onto the back surface of the film to form the convexoconcave pattern, a method in which dope prepared by dissolving the thermoplastic resin in an organic solvent is cast on a support having a plane surface and dried until the film can be peeled and the film is peeled off from the support to form a film having smooth surface and then the convexoconcave patterns are formed on the film surface by pressing the convexoconcave roller onto the surface in any step in the film drying process, a method in which the convexoconcave patterns are formed in the solution casting film forming process by pressing the convexoconcave roller to the film containing residual solvent at the period in which the ratio of poor solvent is not less than 10% by mass, a method in which the production process has a step for heating the film at a temperature of not less than 100° C. after formation of the convexoconcave patterns thereon by pressing the convexoconcave roller to the film surface, a method in which the embossed patterns are formed on a multilayered thermoplastic film constituted by two or more layers produced by co-casting, successive casting or coating by pressing the convexoconcave roller, and a method in which a static electricity elimination device is provided before or after the convexoconcave patterns forming process by the convexoconcave roller. The transferring rate of the film on the occasion of embossing treatment is preferably from 10 to 100 m/min.

As the static electricity elimination device, ones described in paragraph [0028] to [0032] and [0034] to [0035] of Tokkai 2001-129839 are preferably usable, for example, a static eliminating bar such as SJ-B01, manufactured by Keyence Corp., is preferably arranged near the convexoconcave roller for preventing adhesion of dusts by static electricity and uniformly forming the convexoconcave patters. The static elimination device is preferably used for inhibiting the breaking of the film.

[Thermoplastic Resin Film]

Examples of a transparent support for an optical film generally include: a cellulose ester film, a polyester film, a polycarbonate film, a polyallylate film, a polysulfone (including polyethersulfone) film, polyester films such as a polyethylene terephthalate and polyethylene naphthalate film, a polyethylene film, a polypropylene film, cellophane, a polyvinylidene chloride film, a polyvinyl alcohol film, an ethylene vinyl alcohol film, a cyndioctatic polystyrene film, a polycarbonate film, a norbornane resin system film, a polymethyl pentene film, a polyether ketone film, a polyether ketone imide film, a polyamide film, a fluorocarbon resin film, a nylon film, a cycloolefin polymer film, a polymethylmethacrylate film and an acrylic film. In the present invention, a cellulose ester film is preferably used as a thermoplastic film, since the production is easy, the adhesion property to an actinic ray curable resin layer is excellent, it is optically isotropic, and it is optically transparent. Among the cellulose ester films, preferable are a cellulose triacetate film and a cellulose-acetate-propionate film, in view of productivity, cost, transparency, isotropy, and adhesion property. Specific examples of a preferably used cellulose ester film include: Konica Minolta TAC KC8UX2M, KC4UX2M, KC4UY, and KC8UY (above, produced by Konica Minolta Opto, Inc.).

(Cellulose Ester Film)

The cellulose ester is preferably a lower fatty acid ester of cellulose. The lower fatty acid represents a fatty acid having 6 carbon atoms or less. Examples of a specific lower fatty acid ester of cellulose include: cellulose acetate, cellulose propionate, cellulose butyrate and mixed fatty acid esters, for example, cellulose acetate propionate and cellulose acetate butyrate as disclosed in JP-A Nos. 10-45804 and 08-231761 and U.S. Pat. No. 2,319,052.

Specifically, a lower fatty acid ester of cellulose preferably used is cellulose triacetate or cellulose acetate propionate. These cellulose esters may also be used singly or in combination.

When a molecular weight of cellulose ester is too small, tear strength is lowered, but in the case of an excessive amount of the molecular weight, productivity is lowered since viscosity of a cellulose ester solution becomes too high.

The molecular weight of cellulose ester is preferably 7000-200000 in number average molecular weight (Mn), and more preferably 100000-200000.

An average acetylation degree (an amount of bonded acetic acid) preferably employed for cellulose triacetate is 54.0-62.5%, and more preferably 58.0-62.5%. In the case of a small average acetylation degree, a dimension variation is large, and in the case of a large average acetylation degree, the solubility to a solvent becomes lower resulting in lowered productivity.

The preferable cellulose ester other than cellulose triacetate is cellulose ester containing an acyl groups having 2-4 carbon atoms as a substituent, which satisfies following Expressions (I) and (II) at the same time when X is a substitution degree of an acetyl group, and Y is a substitution degree of a propionyl group or a butyryl group.

$$2.6 \leq X+Y \leq 3.0 \quad \text{Expression (I)}$$

$$0 \leq X \leq 2.5 \quad \text{Expression (II)}$$

Among them, cellulose acetate propionate is specifically preferable, and the cellulose acetate propionate satisfying the relations of $1.9 \leq X \leq 2.5$ and $0.1 \leq Y \leq 0.9$ is preferable. The portion which is not substituted by the acyl group is generally occupied by the hydroxyl group. Such the cellulose esters can be synthesized by a commonly known method.

Cellulose ester can be prepared using cotton linter, wood pulp or kenaf as starting materials which may be used alone or in combination. It is specifically preferable to use a cellulose ester prepared from cotton linter (hereafter merely referred to as linter) or from wood pulp singly or in combination.

The thermoplastic resin film used in the present invention may be produced by a solution casting method or by a melt casting method, and is preferably stretched at least in the width direction of the film. Specifically, it is preferable that a film produced by a solution casting method is stretched in a stretching ratio of 1.01-1.5 in the width direction of the film while the film contains a residual solvent of 3 to 40% by mass when it is peeling from the support. More preferably, the film is biaxially stretched in the width direction and in the longitudinal direction, namely, the film is preferably stretched in a stretching ratio of 1.01-1.5 in both directions of the width direction and the longitudinal direction, while the film contains a residual solvent of 3 to 40% by mass when it is peeling from the support. In this way, an anti-reflection film providing an excellent visibility.

In this case, the stretching ratio is preferably 1.01-1.5 and more preferably 1.03-1.45.

In the present invention, a film of a long length is preferably used. The long length specifically means a length of 100-5000 m. The width of the film is preferably 1.3 m or more, more preferably 1.3-4 m, and further more preferably 1.3-2 m.

As for the cellulose ester film used in the present invention, preferable is a transparent support having the light transmittance of preferably 90% or more and more preferably 93% or more.

The thickness of the cellulose ester film support used in the present invention is preferably 10-100 μm, and the moisture permeability under the condition of 25° C. and 90±2% RH is preferably 200 g/m²·24 hours or less, more preferably 10-180 g/m²·24 hours, and specifically preferably 160 g/m²·24 hours or less.

Specifically preferable is that the moisture permeability is in the above range, while the thickness is 20-70 μm.

Here, the moisture permeability of the support can be measured according to the method of JIS Z 0208.

(Plasticizer)

In the cellulose ester film, the following plasticizers are preferably contained. Examples of plasticizers include a phosphoric acid ester based plasticizer, a phthalic acid ester based plasticizer, a trimellitic acid ester based plasticizer, a pyromellitic acid based plasticizer, a glycolate based plasticizer, a citric acid ester based plasticizer, a polyester based plasticizer, and a polyalcohol ester based plasticizer.

Preferably employed as phosphoric acid ester based plasticizers are, for example, triphenyl phosphate, tricresyl phosphate, cresyl diphenyl phosphate, octyl diphenyl phosphate, diphenyl biphenyl phosphate, trioctyl phosphate, tributyl phosphate, and the like. Preferably employed as phthalic acid ester based plasticizers are diethyl phthalate, dimethoxyethyl phthalate, dimethyl phthalate, dioctyl phthalate, dibutyl phthalate, di-2-ethylhexyl phthalate, butylbenzyl phthalate, diphenyl phthalate, dicyclohexyl phthalate, and the like. Preferably employed as trimellitic acid based plasticizers are tributyl trimellitate, triphenyl trimellitate, trimethyl trimellitate, and the like. Preferably employed as pyromellitic acid ester based plasticizers are tetrabutyl pyromellitate, tetraphenyl pyromellitate, tetraethyl pyromellitate, and the like. Preferably employed as glycolate based plasticizers are triacetin, tributyrin, ethylphthalylethyl glycolate, methylphthalylethyl glycolate, butylphthalylbutyl glycolate, and the like. Preferably employed as citric acid ester based plasticizers are triethyl citrate, tri-n-butyl citrate, acetyltriethyl citrate, acetyltri-n-butylcitrate, acetyltri-n-(2-ethylhexyl) citrate, and the like. Examples of other carboxylic acid esters include butyl oleate, methylacetyl recinoleate, dibutyl sebacate, and various trimellitic acid esters.

Employed as polyester based plasticizers may be copolymers of dibasic acids, such as aliphatic dibasic acid, alicyclic dibasic acid, or aromatic dibasic acid with glycol. Aliphatic dibasic acids are not specifically limited. Employed may be adipic acid, sebacic acid, phthalic acid, terephthalic acid, and 1,4-cyclohexyldicarboxylic acid. Employed as glycols may be ethylene glycol, diethylene glycol, 1,3-propylene glycol, 1,2-propylene glycol, 1,4-butylene glycol, 1,3-butylene glycol, and 1,2-butylene glycol. These dibasic acids or glycols may be employed singly or in combination of at least two types.

A polyalcohol ester based plasticizer is composed of at least divalent aliphatic polyalcohol and monocarboxylic acid ester. The following examples are provided as preferable polyalcohol, but the present invention is not limited thereto. Examples of preferable polyalcohol include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-bunanetriol, 1,5-pentanediol, 1,6-hexanediol, hexanetriol, 2-n-butyl-2-ethyl-1, 3-propanediol, galactitol, mannitol, 3-methylpentane-1,3,5-triol, pinacol, sorbitol, trimethylolpropane, trimethylolethane and xylitol. Specifically, triethylene glycol, tetraethylene glycol, dipropylene glycol, tripropylene glycol, sorbitol, trimethylolpropane and xylitol are preferred. As the monocarboxylic acid to be used in the polyalcohol ester, a known aliphatic monocarboxylic acid, alicyclic monocarboxylic acid and aromatic monocarboxylic acid can be employed though the monocarboxylic acid is not limited. The alicyclic monocarboxylic acid and aromatic monocarboxylic acid are preferable for improving moisture permeability and storage ability. As the preferable aliphatic monocarboxylic acid, a saturated fatty acid such as acetic acid, propionic acid, butylic acid, valeric acid, caproic acid, enantic acid, caprylic acid, pelargonic acid, capric acid, 2-ethyl-hexane carboxylic acid, undecylic acid, lauric acid, dodecylic acid, myristic acid, pentadecylic acid, palmitic acid, heptadecylic acid, stearic acid, nonadecanic acid, arachic acid, behenic acid, lignocelic acid, cerotic acid, heptacosanic acid, montanic acid, melisic acid or lacceric acid, and a unsaturated fatty acid such as undecylenic acid, oleic acid, sorbic acid, linolic acid, linolenic acid and arachidonic acid can be exemplified.

Examples of preferable alicyclic monocarboxylic acid include cyclopentene carboxylic acid, cyclohexane carboxylic acid, cyclooctane carboxylic acid and derivatives thereof. The molecular weight of the polyalcohol is preferably 300-1,500, and more preferably from 350 to 750 though the molecular weight is not specifically limited. Larger molecular weight is preferable for storage ability, and smaller molecular weight is preferable for moisture permeability and compatibility with the cellulose ester.

The carboxylic acid used for polyalcohol ester may be used singly or in combination with al least two types. OH—groups in the polyalcohol may be entirely esterified by a carboxylic acid, or OH groups may be partly left.

These plasticizers may be used singly or in combination.

In view of film performance and workability, the consumption amount of the plasticizer to be used is preferably 1-20% by mass, and more preferably 3-13% by mass based on the mass of cellulose ester.

(UV Absorbent)

It is preferred that a UV absorbent is added into a substrate, in the present invention.

Preferably employed as UV absorbents which efficiently absorb UV radiation of wavelengths shorter than 370 nm and minimally absorb visible light of wavelengths longer than 400 nm with respect to good liquid crystal display properties.

Specific examples of UV absorbers which are preferably employed in the present invention include, oxybenzophenone based compounds, benzotriazole based compounds, salicylic acid ester based compounds, benzophenone based compounds, cyanoacrylate based compounds, triazine based compounds and nickel complex salt based compounds, however, the present invention is not limited thereto.

Preferably employed as benzotriazole based UV absorbents are compounds represented by Formula (A) described below.

Formula (A):

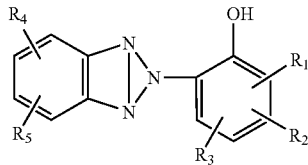

where $R_1$, $R_2$, $R_3$, and $R_5$ may be the same or be different, and each represents a hydrogen atom, a halogen atom, a nitro group, a hydroxyl group, an alkyl group, an alkenyl group, an aryl group, an alkoxy group, an acyloxyl group, an aryloxy group, an alkylthio group, an arylthio group, a monoalkylamino group or a dialkylamino group, an acylamino group, or a heterocyclic group of 5-6 members; and $R_4$ and $R_5$ may be combined to form a 5-6 membered ring.

Each of the above mentioned groups may have an arbitrary substituent.

Next, examples of UV absorbents used for the present invention are specifically provided, but the present invention is not limited thereto.

UV-1: 2-(2'-hydroxy-5'-methylphenyl)benzotriazole
UV-2: 2-(2'-hydroxy-3',5'-di-tert-butylphenyl)benzotriazole
UV-3: 2-(2'-hydroxy-3'-tert-butyl-5'-methylphenyl)benzotriazole
UV-4: 2-(2'-hydroxy-3',5'-di-tert-butylphenyl)-5-chloro benzotriazole
UV-5: 2-(2'-hydroxy-3'-(3",4",5",6"-tetrahydro phthalimidomethyl)-5'-methylphenyl)benzotriazole
UV-6: 2,2-methylenebis(4-(1,1,3,3-tetramethylbutyl)-6-(2H-benzotriazole-2-yl)phenol)
UV-7: 2-(2'-hydroxy-3'-tert-butyl-5'-methylphenyl)-5-chlorobenzotriazole
UV-8: 2-(2H-benzotriazole-2-yl)-6-(n- and iso-dodecyl)-4-methylphenol (TINUVIN171, product of Ciba Specialty Chemicals Inc.)
UV-9: Mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate (TINUVIN109, product of Ciba Specialty Chemicals Inc.)

The compound represented by the following Formula (B) is preferably used as a benzophenon UV absorbent Formula (B):

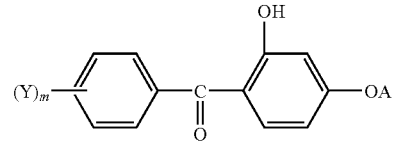

where Y represents a hydrogen atom, a halogen atom, an alkyl group, an alkenyl group, an alkoxyl group, or a phenyl group, and the alkyl group, the alkenyl group, and the phenyl group may have a substituent; A represents a hydrogen atom, an alkyl group, an alkenyl group, a phenyl group, a cycloalkyl group, an alkylcarbonyl group, an alkylsulfonyl group, or a —CO(NH)$_{n-1}$-D group, wherein D represents an alkyl group, an alkenyl group or a phenyl group which may have a substituent; and m and n each represent 1 or 2.

In the above description, the alkyl group represents, for example, a normal or branched aliphatic group having not more than 24 carbon atoms, the alkoxyl group represents, for example, an alkoxyl group having not more than 18 carbon atoms, and the alkenyl group represents, for example, an alkenyl group having not more than 16 carbon atoms, such as an allyl group or a 2-butenyl group. Examples of a substituent to the alkyl group, the alkenyl group, and the phenyl group include: for example, a halogen atom such as a chlorine atom, a bromine atom or a fluorine atom; a hydroxyl group; and a phenyl group (the phenyl group may further have an alkyl group or a halogen atom as a substituent).

Specific examples of a benzophenone based compound represented by Formula (B) are shown below, however, the present invention is not limited thereto.

UV-10: 2,4-dihydroxy benzophenone
UV-11: 2,2'-dihydroxy-4-methoxybenzophenone
UV-12: 2-hydroxy-4-methoxy-5-sulfobenzophenone
UV-13: Bis(2-methoxy-4-hydroxy-5-benzoylphenyl methane)

UV absorbents which are preferably employed in the present invention include benzotriazole based UV absorbents and benzophenone based UV absorbents which exhibit high transparency and excellent effects to minimize degradation of polarizing plates as well as liquid crystals. Of these, more preferably employed are benzotriazole based UV absorbents which exhibit less undesired coloration.

Further, UV absorbents at a distribution coefficient of at least 9.2, described in JP-A No. 2001-295209, enhance the surface quality of supports and exhibit excellent coating properties. It is specifically preferable to use UV absorbents of a distribution coefficient of at least 10.1.

Further, preferably employed are polymer type UV absorbers (or UV radiation absorptive polymers) represented by Formula (1) or (2) described in JP-A No. 6-148430 and represented by Formulas (3), (6), and (7) described in JP-A No. 2000-156039. As a polymer type UV absorber, PUVA-30M (manufactured by Otsuka Chemical Co., Ltd.) is commercially available.

(Particles)

In the present invention, particles are preferably contained in a cellulose ester film, within the content where anti-glare property is not provided. Example of the particles include inorganic particles such as particles made of silicon dioxide, titanium dioxide, aluminum oxide, zirconium oxide, calcium carbonate, kaolin, talc, baked calcium silicate, hydrated calcium silicate, aluminum silicate, magnesium silicate or phosphate, and crosslinked polymer particles. Among them, silicon dioxide is preferable since the haze of the film can be lowered. The average particle diameter of secondary particle particles is preferably in the range of 0.01-1.0 μm, and the content is preferably 0.005-0.3% by mass based on the mass of cellulose ester. In many cases, such as silicon oxide particles are surface-treated with an organic substance. These particles are preferable since the haze of the film is suppressed low. The preferable organic compound for the surface treatment includes halosilane, alkoxysilane (specifically having a methyl group), silazane and siloxane. The particles having lager average diameter displays higher matting effect and one having lower average diameter is superior in transparency. The primary particle average particle diameter is preferably in the range of 5-50 nm, and more preferably in the range of 7-16 nm. It is preferred that these particles are usually coagulated in a cellulose ester film as coagulated particles, whereby convexoconcave of 0.01-1.0 μm is formed on the cellulose ester film surface. Examples of silicon dioxide particles include AEROSIL 200, 200V, 300, R972, R972V, R974, R202, R812, OX50, TT600 and so forth, each manufactured by Nippon Aerosil Co., Ltd., and Aerosil 200V, R972, R972V, R974, R202 and R812 are preferable. These particles may be employed in combination with two or more kinds thereof. In the case of being used in combination with two or more kinds, they can be mixed at an arbitrary content ratio to be used. In such the case, Particles having a different particle diameter, made of a different material may be employed, for example, AEROGIL 200V and R972V can be used at mass ration in the range of 0.1:99.9-99.9:0.1. In the present invention, particles contained with cellulose ester, other additives, and an organic solvent may be dispersed during adjusting a dope, but it is preferable that a dope is adjusted in the state of another particle dispersion sufficiently dispersed with a cellulose ester solution. In order to disperse particles, it is preferred that a fine dispersing process is conducted by a homogenizer possessing a high shear force(high pressure homogenizer), after immersing in an organic solvent in advance. It is preferable that the resulting solution is dispersed in a larger amount of organic solvent after this, and combined with a cellulose ester solution to make a dope by mixing with an in-line mixer. In this case, a UV absorbent may be added into the particle dispersion to make a UV absorbent liquid.

The above degradation preventing agent, UV absorbent and/or particles may be added with cellulose ester and a solvent when a cellulose ester solution is prepared, or may be added during or after preparing the solution.

(Organic Solvent)

There is no specific limitation to the organic solvent helpful in preparing the dope of the cellulose ester film used, when the cellulose ester film is formed via a solution-casting method, in the present invention, as far as the organic solvent simultaneously dissolves cellulose ester, a compound having at least two aromatic rings in which at least two aromatic rings have planar structures and other additives. For example, methylene chloride can be cited as a chlorine-based organic solvent. The non-chlorine-based organic solvent is exemplified by methyl acetate, ethyl acetate, amyl acetate, acetone, tetrahydrofuran, 1,3-dioxolane, 1,4-dioxane, cyclohexanone, ethyl formate, 2,2,2-trifluoro ethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol,2,2,3,3,3-pentafluoro-1-propanol, and nitroethane. Methylene chloride, methyl acetate, ethyl acetate and acetone can be preferably used. Use of methyl acetate is specifically preferred.

The dope of the present invention preferably contains 1-40% by mass of alcohol having 1-4 carbon atoms, in addition to the aforementioned organic solvent. An increase in the percentage of alcohol in the dope causes gelation of the web, resulting in easy separation from the metal supporting member. A smaller amount of alcohol promotes dissolution of the cellulose ester in the non-chlorine-based organic solvent. Examples of the alcohol having 1-4 carbon atoms include: methanol, ethanol, n-propanol, iso-propanol, n-butanol, sec-butanol and tert-butanol. Of these, use of ethanol is preferred because of dope stability, relatively low boiling point, excellent drying property and non-toxicity.

In order to obtain a preferable quality of the film surface, the content of cellulose ester in the dope is preferably controlled within 1-40% by mass and the viscosity of the dope is preferably controlled within 10-50 Pa·s.

Next, the step of providing a convexoconcave structure on the hard coat layer will be explained.

In the present invention, actinic rays are preferably applied in the state where actinic-ray curable resin for hard coat layer is sandwiched between the convexoconcave roller having a convexoconcave structure and a support. After the actinic ray curable resin is hardened by polymerization, the support and the actinic ray cured layer is peeled from the covexoconcave roller, whereby a convexoconcave structure is provided on the hard coat layer.

FIG. 6 is a schematic diagram of the covexoconcave surface forming apparatus using the convexoconcave roller for the hard coat layer of the present invention. Ultraviolet ray curable resin for hard coat layers is applied to form a layer from a die 22 on the film F fed from the feeding roll 21, and after drying using the film drying equipment 23, a covexoconcave surface is formed on the surface of the ultraviolet ray curable resin layer with the convexoconcave roller 24 and the back roller 25 which is in the opposite side of the convexoconcave roller 24. In this step, a gas is preferably provided to the contact surface between the convexoconcave roller and the ultraviolet ray curable resin layer by blowing a gas containing substantially no oxygen from the gas nozzle 28 to the area between the convexoconcave roller and the ultraviolet ray curable resin layer on the film F. Subsequently, the ultraviolet ray curable resin layer is irradiated with ultraviolet rays from the curing apparatus 26 which is in the location opposite to the convexoconcave roller, to be hardened, then the film is wound in the winding roll 27. It is also preferable to further equip a curing apparatus 26' to apply ultraviolet rays for complete hardening. In this case, a convexoconcave structure is preferably formed in advance on the surface opposite the hard coat layer side of the thermoplastic film in order to avoid complex steps.

FIG. 7 shows an apparatus to harden an ultraviolet curable resin, in which the hardening apparatus 26 such as a high-pressure mercury lamp is installed in the interior of a transparent hollow roller 34 such as a quartz glass cylinder as a convexoconcave roller, which transmits ultraviolet rays. The ultraviolet ray curable resin layer applied in advance on the film F comes in close contact with the hollow roller 34 by used of the nip roll 32 made of rubber, and is provided with a convexoconcave structure by the convexoconcave mold cylindrically formed on the hollow roller. The ultraviolet ray curable resin layer is hardened by being irradiated with the ultraviolet rays applied by the curing apparatus equipped in the hollow hollow roller 34, while a gas is blown from gas nozzles 28 and 28'. The blown gas is preferably an inert gas such as nitrogen, which contains substantially no oxygen, in order to carry out sufficient hardening. The convexoconcave structure on the surface of the quartz roll can be formed via a sand blast method or an etching method.

[Hard Coat Layer]

The hard coat layer of the present invention is preferably an actinic ray curable resin layer which refers to a layer predominantly containing a resin curable by being irradiated with actinic rays such as ultraviolet rays or electron beam via a crosslinking reaction. As the actinic ray curable resin, a component containing a monomer having an ethylenically unsaturated double bond is preferably employed. Such a component is hardened by being irradiated with an actinic ray such as ultraviolet rays or electron beams to form an actinic ray cured resin layer. The actinic ray curable resin is typically represented by a UV curable resin and an electron beam curable resin, and preferable is a resin curable by ultraviolet rays.

Examples of a UV curable resin include: an ultraviolet ray curable urethane acrylate resin, a UV curable polyester acrylate resin, a UV curable epoxyacrylate resin, a UV curable polyol acrylate resin and a UV curable epoxy resin. Of these, a UV curable acrylate resin is preferable.

Generally, the UV curable acryl urethane resin can be easily obtained when the product obtained by a reaction of isocyanate monomer or prepolymer with the polyester polyol is made to react with the acrylate monomer containing a hydroxyl group, such as 2-hydroxyethylacrylate, 2-hydroxyethylmethacrylate (hereinafter referred to merely as "acrylate" on the understanding that the acrylate includes methacrylate), and 2-hydroxypropylacrylate. For example, a mixture with 100 parts of Unidic 17-806 (produced by Dainippon Ink and Chemicals Incorporated.) and 1 part of Coronate L (by Japan Polyurethane Co., Ltd.) disclosed in JP-A No. 59-151110 is preferably used.

Generally, the UV curable polyester acrylate resin can be easily obtained when the hydroxyl group or carboxyl group at the polyester terminal is made to react with a monomer such as 2-hydroxyethylacrylate, glycidylacrylate or acrylic acid (e.g., JP-A No. 59-151112).

The UV curable epoxyacrylate resin is obtained by reaction of the hydroxyl group at the terminal of epoxy resin with a monomer such as acrylic acid, acrylic acid chloride or glycidylacrylate.

The UV curable polyol acrylate resin is exemplified by ethylene glycol(meth)acrylate, polyethylene glycol di(meth) acrylate, glycerin tri(meth)acrylate, trimethylol propane triacrylate, pentaerythritol triacrylate, pentaerythritol tetraacrylate, dipentaerythritol pentaacrylate, dipentaerythritol hexaacrylate and alkyl-modified dipentaerythritol pentaacrylate.

As examples of the UV curable epoxyacrylate resin, UV curable epoxy resin, epoxy actinic radiation reactive compounds will be shown:

(a) Glycidyl ether of bisphenol A (This compound provides a mixture having a different degree of polymerization through reaction with epichlorhydrin and bisphenol A).

(b) A compound, containing the compound including the glycidyl ether group at the terminal, for initiating reaction of epichlorhydrin, ethylene oxide and/or propylene oxide with the compound containing two pieces of phenolic OH such as bisphenol A (c) Glycidyl ether of 4,4'-methylene bisphenol (d) Epoxy compound of phenol formaldehyde resin of the novolak resin or resol resin (e) A compound containing the aliphatic ring epoxide; e.g. bis(3,4-epoxycyclohexylmethyl) oxalate, bis(3,4-epoxycyclohexylmethyl)adipate, bis(3,4-epoxy-6-cyclohexylmethyl) adipate, bis(3,4-epoxycyclohexylmethyl pimelate, 3,4-epoxycyclohexylmethyl-3,4-epoxycyclohexane carboxylate, 3,4-epoxy-1-methylcyclohexylmethyl-3',4'-epoxycyclohexane carboxylate, 3,4-epoxy-1-methyl-cyclohexylmethyl-3', 4'-epoxy-1'-methylcyclohexane carboxylate, 3,4-epoxy-6-methyl-cyclohexylmethyl-3',4'-epoxy-6'-methyl-1'-cyclohexa carboxylate, 2-(3,4-epoxycyclohexyl-5',5'-spiro-3",4"-epoxy) cyclohexane-metha-dioxane.

(f) Diglycidyl ether of dibasic acid, e.g., diglycidyl oxalate, diglycidyladipate, diglycidyl tetrahydrophthalate, diglycidylhexahydrophthalate, and diglycidyl phthalate (g) Diglycidyl ether of glycol, e.g., ethylene glycol diglycidyl ether, diethylene glycol diglycidyl ether, propylene glycol diglycidyl ether, polyethylene glycol diglycidyl ether, polypropylene glycol diglycidyl ether, copolymer (ethylene glycol-propylene glycol)diglycidyl ether,1,4-butadiol diglycidyl ether, and 1,6-hexanedioldiglycidyl ether (h) Glycidyl ester of polymeric acid, e.g. polyacrylic acid polyglycidyl ester and polyester diglycidyl ester (i) Polyvalent alcohol glycidyl ether, e.g., glycerine triglycidyl ether, trimethylol propane triglycidyl ether, pentaerithritol diglycidyl ether, pentaerithritol triglycidyl ether, pentaerithritol tetraglycidyl ether, and glucose triglycidyl ether (j) Diglycidyl ether of 2-fluoroalkyl-1,2-diol, e.g. the same compounds as those exemplified as the fluorine-containing epoxy compound of the fluorine-containing resin of the aforementioned low-refractive index substances (k) Fluorine-containing alkane terminal diolglycidyl ether, e.g. fluorine-containing epoxy compound of fluorine-containing resin of the aforementioned low-refractive index substances The molecular weight of the aforementioned epoxy compound is 2,000 or less in terms of the average molecular weight, and more preferably 1,000 or less.

When the aforementioned epoxy compound is cured by actinic radiation, it is effective to mix the compound containing the multifunctional group given in (h) and (i) in order to increase hardness further.

The photo-polymerization initiator or photosensitizer for cation polymerization of the epoxy actinic radiation reactive compound is capable of discharging a cation polymerization initiating substance by application of actinic radiation. What is particularly preferred is a group of double salts of the onium salt that discharges the Lewis acid capable of initiating the cation polymerization by irradiation.

The actinic radiation reactive compound epoxy resin causes polymerization and forms a crosslinking structure or network structure by cation polymerization—not by radial polymerization. Unlike the radical polymerization, this resin is not affected by oxygen in the reaction system. Thus, this is a preferable actinic radiation reactive resin. the present invention causes polymerization, using the photo-polymerization initiator or photosensitizer capable of discharging the substance for initiating the cation polymerization by application of actinic radiation. A particularly preferred photo-polymerization initiator is a group of double salts of the onium salt that discharges the Lewis acid capable of initiating the cation polymerization by irradiation.

The representative compounds are expressed by following Formula (a):

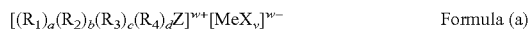

Formula (a)

where the cation is onium, and Z denotes S, Se, Te, P, As, Sb, Bi, O, halogen (e.g. I, Br, Cl) or N=N(diazo). $R_1$, $R_2$, $R_3$ and $R_4$ indicate the organic groups that can be the same or different. a, b, c and d are integers from 0-3, and a+b+c+d is equal to the affinity unit of Z. Me denotes a metal or semi-metal (metalloid) as a central atom of the halogenated substance complex, and includes B, P, As, Sb, Fe, Sn, Bi, Al, Ca, In, Ti, Zn, Sc, V, Cr, Mn and Co. X indicates halogen. w denotes the net electrical charge of the halogenated complex ion, and v shows the number of the halogen atoms in the halogenated complex ion.

The negative ion $[MeX_v]^{w-}$ of the aforementioned Formula (a) is specifically exemplified by, for example, tetrafluoroborate ($BF_4^-$) and tetrafluorophosphate ($PF_4^-$).

Examples of other negative ions include: hyperchloride ion ($ClO_4^-$), trifluoromethyl sulfurous acid ion ($CF_3SO_3^-$) and toluene sulfonic acid ion.

Among such onium salts, an aromatic onium salt in particular can be effectively used as a cation polymerization initiator. Of these, preferable are, for example, a VIA group aromatic onium salt, an oxyosulfoxonium salt, an aromatic diazonium salt, and a thiopyrylium salt. Further, the aluminum complex and photodegradable silicon compound based polymerization initiator can be mentioned. The abovementioned cation polymerization initiator can be used in combination with a photosensitizer such as benzophenone, benzoin isopropyl ether or thioxanthone.

Further, such a photosensitizer as n-butyl amine, triethylamine, tri-n-butylphosphine can be used in the case of actinic radiation reactive compound containing the epoxyacrylate group. With respect to 100 parts by mass of UV reactive compound, 0.1-15 parts by mass of the photosensitizer and photo-initiator used in this actinic radiation reactive compound is sufficient to initiate photoreaction. Preferably, 1-10 parts by mass is used. This sensitizer preferably has the absorption maximum in near-ultraviolet ray region through the visible ray region.

In the actinic radiation curable resin composition crucial in the present invention, 0.1-15 parts by mass of polymerization initiator is preferably used with respect to 100 parts by mass of the actinic radiation curable epoxy resin (prepolymer) generally. Use of 1-10 parts by mass of polymerization initiator is more preferred.

Epoxy resin can be used in combination with the aforementioned urethane acrylate type resin, polyether acrylate type resin. In this case, a combined use with the actinic radiation radial polymerization initiator and actinic radiation cation polymerization initiator is preferred.

In the present invention, an oxetane compound can be used.

In the actinic ray curable resin layer relating to the present invention, a binder, for example, a hydrophilic resin such as a thermoplastic resin, a thermocurable resin or gelatin may be used by mixing with the aforementioned actinic ray curable resin. Such a resin preferably contains a polar group in the molecule. Examples of the polar group include: —COOM, —OH, —NR$_2$, —NR$_3$X, —SO$_3$M, —OSO$_3$M, —PO$_3$M$_2$ and —OPO$_3$M (where M indicates a hydrogen atom, an alkali metal or an ammonium group; X indicates an acid forming an amine salt; R shows a hydrogen atom or an alkyl group).

The actinic radiation usable in the present invention includes, for example, ultraviolet rays, electron beams, γ-rays. There is no restriction to the type of the light source if it can activate a compound, however, preferable are ultraviolet rays or electron beams, and ultraviolet rays are specifically preferable, since handling is easy and a high level of energy can be easily obtained. Any light source capable of generating the ultraviolet ray can be used as the light source of the ultraviolet ray for causing photo-polymerization of ultraviolet ray reactive compound. For example, it is possible to use a low voltage mercury lamp, an intermediate voltage mercury lamp, a high voltage mercury lamp, an extra-high voltage mercury lamp, a carbon arc light, a metal halide lamp and a xenon lamp. Further, an ArF excimer laser, a KrF excimer laser, an excimer lamp and synchrotron radiation can also be used. The condition of irradiation differs according to the type. The preferred amount of irradiation is 20 mJ/cm² or more. The more preferred amount is 50-10000 mJ/cm², and still more preferred amount is 50-2000 mJ/cm².

When the film is irradiated with actinic rays, tension is preferably applied in the longitudinal direction of the film. The applied tension is preferably 30-300 N/m. The method to apply tension is not specifically limited. Tension may be applied in the longitudinal direction of the film on a back roll.

In the present invention, the photo-polymerization or photo-crosslinking reaction of the actinic ray curable resin can be initiated only by using the abovementioned actinic ray curable resin, however, it is preferable to use a photosensitizer or a photo-initiator, since a long preparatory time may be required for polymerization or the initiation of polymerization may be delayed, whereby the polymerization is accelerated.

(Photo-Initiator, Photosensitizer)

In the actinic ray curable resin relating to the present invention, a photo-initiator or a photosensitizer may be used when the actinic ray curable resin is irradiated with actinic rays.

Specifically, a photosensitizer include: acetophenone, benzophenone, hydroxybenzophenone, Michler's ketone, α-amyloxym ester, thioxanthone and a derivative thereof are cited. Further, when a photoreaction agent is used to synthesize the epoxyacrylate resin, such a sensitizer as n-butyl amine, triethylamine, tri-n-butylphosphine can be used. The using amount of the photo-initiator and/or a photosensitizer contained in the ultraviolet ray curable resin composition from which volatile after coating is removed is preferably 1-10% by mass, and specifically preferably 2.5-6% by mass based on the mass of the ultraviolet ray curable resin composition.

When an ultraviolet ray curable resin is used as the actinic ray curable resin, ultraviolet ray absorbent can be mixed in the ultraviolet ray curable resin composition within the range the ultraviolet ray absorbent does not interrupt the photo-curing of the aforementioned ultraviolet ray curable resin.

(Antioxidant)

To increase the heat resistance of the actinic ray curable resin, it is possible to select an antioxidant that does not affect the photocuring reaction and use in the actinic ray curable resin. For example, a hindered phenol derivative, a thiopropionic acid derivative, and a phosphite derivative can be cited. To put it more specifically, 4,4'-thiobis(6-tert-3-methylphenol), 4,4'-butylidene bis(6-tert-butyl-3-methylphenol), 1,3,5-tris(3,5-di-tert-butyl-4-hydroxybenzyl)isocyanurate, 2,4,6-tris(3,5-di-tert-butyl-4-hydroxybenzyl)mesitylene, and di-octadecyl-4-hydroxy-3,5-di-tert-butylbenzylphosphate can be cited.

Examples of an ultraviolet ray curable resin available on the market include: Adekaoptomer KR, BY Series such as KR-400, KR-410, KR-550, KR-566, KR-567 and BY-320B (manufactured by Asahi Denka Co., Ltd.); Koeihard A-101-KK, A-101-WS, C-302, C-401-N, C-501, M-101, M-102, T-102, D-102, NS-101, FT-102Q8, MAG-1-P20, AG-106 and M-101-C (manufactured by Koei Kagaku Co., Ltd.); Seikabeam PHC2210(S), PHC X-9(K-3), PHC2213, DP-10, DP-20, DP=30, P1000, P1100, P1200, P1300, P1400, P1500, P1600, SCR900 (manufactured by Dainichiseika Kogyo Co., Ltd.); KRM7033, KRM7039, KRM7131, UVECRYL29201 and UVECRYL29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Olex No. 340 Clear (manufactured by Chyugoku Toryo Co., Ltd.); Sunrad H-601, RC-750, RC-700, RC-600, RC-500, RC-611 and RC-612 (manufactured by Sanyo Kaseikogyo Co., Ltd.); SP-1509 and SP-1507 (manufactured by Syowa Kobunshi Co., Ltd.); RCC-15C (manufactured by Grace Japan Co., Ltd.) and Aronix M-6100, M-8030 and M-8060 (manufactured by Toagosei Co., Ltd.).

The solid content of the coating composition containing the actinic ray curable resin is preferably 10-95% by mass, and an appropriate solid content is selected depending on the coating method.

(Surfactant)

The actinic ray curable resin layer may contain a surfactant. As the surfactant, preferable is a silicon-containing surfactant or a fluorine-containing surfactant.

A siliconcontaining surfactant preferable is a nonion surfactant in which the hydrophobic group is dimethylpolysiloxane and the hydrophilic group is polyoxyalkylenes.

A nonionic surfactant generally refers to a surfactant not provided with a group which dissociate in an aqueous solution, however, is provided with a hydroxyl group of polyhydric alcohols as a hydrophilic group in addition to a hydrophobic group, and further with such as a polyalkylene chain (polyoxyethylene) as a hydrophilic group. Hydrophilic property becomes strong as the number of an alcoholic hydroxyl group increases and as the polyoxyalkylene chain (polyoxyethylene chain) becomes long. A nonionic surfactant according to the present invention is characterized by having dimethylpolysiloxane as a hydrophobic group.

By utilizing a nonionic surfactant constituted of dimethylpolysiloxane as a hydrophobic group and polyoxyalkylene as a hydrophilic group, unevenness is decreased and anti-staining property of the film surface is improved, with respect to the aforesaid low refractive index layer. A hydrophobic group comprising polysiloxane is oriented on the surface to make the film surface being hardly contaminated. This effect cannot be obtained by other surfactants.

Specific examples of these nonionic surfactants include such as silicone surfactants SILWET L-77, L-720, L-7001, L-7002, L-7604, Y-7006, FZ-2101, FZ-2104, FZ-2105, FZ-2110, FZ-2118, FZ-2120, FZ-2122, FZ-2123, FZ-2130, FZ-2154, FZ-2161, FZ-2162, FZ-2163, FZ-2164, FZ-2166 and FZ-2191, manufactured by Nippon Unicar Co., Ltd.

Further, listed are such as SUPERSILWET SS-2801, SS-2802, SS-2803, SS-2804 and SS-2805.

Further, a structure of a nonionic type surfactant, which is constituted of dimethylpolysiloxane as a hydrophobic group and polyoxyalkylene as a hydrophilic group, is preferably a block copolymer of a straight chain form in which a dimethylpolysiloxane portion and a polyoxyethylene chain are alternately and repeatedly bonded. It is superior because of a long chain length of the primary chain structure and the straight chain form structure. It is considered because one surfactant can adsorb on the surface of a silica particle to cover said particle at plural portions since the surfactant is a block copolymer which is comprised of a hydrophilic group and a hydrophobic group alternately repeating.

Specific examples thereof include such as silicon-containing surfactants ABN, SILWET FZ-2203, FZ-2207 and FZ-2208, manufactured by Nippon Unicar Co., Ltd.

As a fluoro-surfactant, a surfactant in which a hydrophobic group has a perfluorocarbon chain can be used. Examples of such a fluoro-surfactant include: fluoroalkyl carboxylic acid, disodium N-perfluorooctanesulfonyl glutamic acid, sodium 3-(fluoroalkyloxy)-1-alkyl-sulfonic-acid, sodium 3-(ω-fluoroalkanoyl-N-ethylamino)-1-propane sulfonic acid, N-(3-perfluorooctanesulfonamide)propyl-N,N-dimethyl-N-carboxymethylene ammonium betaine, perfluoroalkylcarboxylic acid, perfluorooctanesulfonate diethanol amide, perfluoroalkyl sulfonic acid salt, N-propyl-N-(2-hydroxyethyl)perfluorooctane sulfonamide, perfluoroalkyl sulfonamide propyl trimethyl ammonium salt, perfluoroalkyl-N-ethylsulfonylglycin salt, phosphoric acid bis(N-perfluorooctyl sulfonyl-N-ethylaminoethyl). In the present invention, a nonionic surfactant is preferably used.

These fluorinated surfactants are commercialized by product names, such as MEGAFAC, EFTOP, SURFLON, FTERGENT, UNIDYNE, FLORARD, and ZONYL.

The addition amount of a fluoro-surfactant is 0.01-3.0% by mass and more per preferably 0.02 to 1.0% by mass based on the mass of the solid component in the coating liquid of the actinic ray curable resin layer.

Other surfactants may be utilized in combination, and appropriately utilized in combination are, for example, anionic surfactants such as a sulfonic acid ester surfactant, a sulfuric acid ester surfactant and a phosphoric acid ester surfactant; and nonionic surfactants such as an ether surfactant and an ether ester surfactant, which are provided with a polyoxyetylene chain as a hydrophilic group.

The coating solution for the actinic ray curable resin layer may contain solvent which may be a mixed solution or a diluted solution. Examples of an organic solvent contained in the coating solution include: hydrocarbons (toluene and xylene), alcohols (methanol, ethanol, isopropanol, butanol and cyclohexanol), ketones (acetone, methyl ethyl ketone and methyl isobutyl ketone), esters (methyl acetate, ethyl acetate and methyl lactate), glycol ethers and other organic solvents. These organic solvents may be also used in combination. The above mentioned organic solvents preferably contain propylene glycol monoalkyl ether (the alkyl having 1 to 4 carbon atoms) or propylene glycol monoalkyl ether acetate (the alkyl having 1 to 4 carbon atoms) in an amount of 5% by weight or more, and more preferably 5-80% by weight.

The hard coat layer composition coating solution can be coated using a known method such as a gravure coater method, a spinner coater method, a wire bar coater method, a roll coater method, a reverse coat method, an extrusion coater method, an air doctor coater method. With respect to the coating amount, the wet thickness is preferably 5-30 µm and more preferably 10-20 µm. The dry thickness is preferably 0.1-20 µm and more preferably 3-10 µm. The preferred coating speed is 10-60 m/min.

After having been coated and dried, the actinic ray curable resin layer composition is preferably subjected to a curing treatment by being exposed to actinic radiation such as ultraviolet ray or electron beam. The preferred time duration for exposure to actinic radiation is 0.5 seconds through 5 minutes. From the viewpoint of curing efficiency of the actinic radiation curable resin and work efficiency, the more preferred time duration is 3 seconds through 2 minute.

(Particles)

Particle of an inorganic compound or an organic compound may be incorporated in thus obtained actinic ray curable resin layer, in order to adjust an anti-scratching property, lubricity, a refractive index or an anti-grare property.

The convexoconcave structure used in the present invention is mainly formed by embossing using a convexoconcave roller, however, a commonly used method of incorporating particles in order to provide convexoconcave structure on the actinic ray curable resin layer may also be subsidiarily used in the present invention.

Particles may also be incorporated in the actinic ray curable resin layer for the purposes of: avoiding blocking of the film while being wound in a role, enhancing the adhesion to an anti-reflection layer, increasing the refractive index of the actinic ray curable resin layer so as to contribute to lower the reflectance of the film when an anti-reflection layer is laminated, providing an anti-static property, and relaxing the charge generated in the transportation process. In such a case, the above purposes are preferably attained with the addition of a small amount of the particles in order to keep the haze of the film low.

Examples of inorganic particles used in the actinic ray curable resin layer: include silicon oxide, titanium oxide, aluminum oxide, tin oxide, indium oxide, ITO, zinc oxide, zirconium oxide, magnesium oxide, calcium carbonate, calcium carbonate, talc, clay, calcined kaolin, calcined calcium silicate, hydrated calcium silicate, aluminum silicate, magnesium silicate and calcium phosphate. Among these, silicon oxide, titanium oxide, aluminum oxide, zirconium oxide, magnesium oxide are specifically preferable.

Examples of organic particles include: particles of polymethacrylic acid methyl acrylate resin, acryl-styrene resin, polymethyl methacrylate resin, silicon resin, polystyrene resin, polycarbonate resin, benzoguanamine resin, melamine resin, polyolefin resin, polyester resin, polyamide resin, polyimide resin and polyfluorinatedethylene resin. Specifically preferable organic particles include, for example: particles of cross-linked polystylene (such as SX-130H, SX-200H and SX-350H manufactured by Soken Chemical & Engineering Co., Ltd.) and particles of polymethyl methacrylate (such as MX150 and MX300 manufactured by Soken Chemical & Engineering Co., Ltd.).

The average particle diameter of the particles is preferably 0.01 to 5 μm, more preferably 0.1 to 5 μm, and specifically preferably 0.1 to 4.0 μm. Further, preferable is to use particles of two or more kinds having different diameters in combination. The ratio of the ultraviolet ray curable resin composition to particles is preferably 0.1 to. 30 mass parts of particles in 100 mass parts of the resin composition.

The refractive index of the actinic ray curable resin layer of the present invention is preferably 1.5-2.0, and specifically preferably 1.6-1.7 in view of the optical design for obtaining a low reflectance. The refractive index of the actinic ray curable resin layer can be controlled by the refractive index or content of the particles or the inorganic binder to be added.

In the coating solution of the actinic ray curable resin composition, a silicon compound such as a polyether modified silicone oil, is preferably added. The number average molecular weight of the polyether modified silicone oil is preferably from 1,000 to 100,000 and more preferably from 2,000 to 50,000. Addition of the polyether modified silicone oil with a number average molecular weight of less than 1,000 may lower the drying rate of the coating solution, while that of more than 100,000 may be difficult to bleed out at the surface of the coated film.

Silicon compounds available on the market include, for example: DKQ8-779 (a trade name of Dow Corning Corp.), SF3771, SF8410, SF8411, SF8419, SF8421, SF8428, SH200, SH510, SH1107, SH3749, SH3771, BX16-034, SH3746, SH3749, SH8400, SH3771M, SH3772M, SH3773M, SH3775M, BY-16-837, BY-16-839, BY-16-869, BY-16-870, BY-16-004,BY-16-891, BY-16-872, BY-16-874, BY22-008M, BY22-012M, FS-1265 (all being trade names of Dow Corning Toray Silicone Co., Ltd.), KF-101, KF-100T, KF351, KF352, KF353, KF354, KF355, KF615, KF618, KF954, KF6004, siliconeX-22-945, X22-160AS (all being trade names of Shin-Etsu Chemical Co., Ltd.), XF3940, XF3949 (both being trade names of Toshiba Silicones Co., Ltd.), DISPARLON LS-009 (a trade name of Kusumoto Chemicals Ltd.), GLANOL410 (a trade name of Kyoeisha Chemicals Co., Ltd.), TSF4440, TSF4441, TSF4445, TSF4446, TSF4452, TSF4460 (all being trade names of GE Toshiba Silicones Co., Ltd.), BYK-306, BYK-330, BYK-307, BYK-341, BYK-361 (all being trade names of BIC Chemie Japan KK), L Series, Y Series and FZ Series (all from Nippon Unicar Co., Ltd.).

These compositions may improve the coating ability of a coating solution onto a support or to an under coat layer. These compounds used in the top layer of film may contribute to improve water-repellency, oil-repellency, anti-stain property as well as scratch resistance of the film. The content of the silicon compound is preferably from 0.01-3% by mass based on the solid components in the coating solution.

The actinic ray curable resin layer of the present invention may contain electrically conductive metal oxide particles. As the electrically conductive metal oxide particles, metal oxide particles of a metal selected from Zr, Sn, Sb, As, Zn, Nb, In or Al are preferably used. Examples of such particles include: aluminum oxide, tin oxide, indium oxide, ITO (indium tin oxide), ZnO, and aluminum silicate. ITO is specifically preferably used.

The actinic ray curable resin layer of the present invention may have a multi-layer structure containing two or more layers. One of such layers may be an anti-static layer containing the above conductive particles or ionic polymer particles. Or one of the layers may contain color regulator to control color tone to be used as a color adjusting filter, or may contain an electro-magnetic sealding material or an infrared absorber to carry out respective functions.

[Anti-Reflection Layer]

In the present invention, an anti-reflection layer is provided on the surface of the abovementioned hard coat layer to form an anti-glare anti-reflection film.

The anti-reflection layer used in the present invention will be explained.

With respect to the anti-reflection layer usable in the present invention, the optical layer thickness of a low refractive index layer is set to $\lambda/4$, for light having a wavelength of $\lambda$ to form the anti-reflection layer. The optical layer thickness means a quantity defined by the product of refractive index n of the layer and the layer thickness d. The extent of refractive index is mostly determined by metal or compound contained, and for example, Ti makes it high, Si makes it low, and a compound containing F makes it further lower, thus, the refractive index is established by the combination. The refractive index and the layer thickness are computed and calculated through measurement of spectral reflectance.

The anti-glare anti-reflection film of the present invention preferably has multi-layers having different refractive indexes. Such multi-layer can be laminated on a transparent cellulose ester support having thereon an actinic ray curable resin layer, considering the refractive index, the layer thickness, the number of layers and the lamination order so as to obtain a lower reflectance due to interference of light. The anti-reflection layer is formed in combination of a high refractive index layer having a refractive index higher than that of the support and a low refractive index layer having a refractive index lower than that of the support, or preferably in combination of three or more refractive index layers, for example, preferable is a lamination of three layers, from the support side: an intermediate refractive index layer (a layer having a refractive index higher than that of the support or the actinic ray curable resin layer, while having a refractive index lower than that of the high refractive index layer)/a high refractive index layer/a low refractive index layer.

Also, it is preferable to use a combination of four or more layers in which two or more high refractive index layers and two or more low refractive index layers are laminated alternately.

Preferable examples of a layer construction of the anti-reflection layer of the present invention will be shown below, wherein "/" represents the lamination of layers.

Back coat layer/Support/Hard coat layer/Low-refractive-index layer

Back coat layer/Support/Hard coat layer/Intermediate refractive index layer/Low-refractive index layer Back coat layer/Support/Hard coat layer/High refractive index layer/Low refractive index layer Back coat layer/Support/Hard coat layer/Intermediate refractive index layer/High refractive index layer/Low-refractive-index layer Back coat layer/Support/Anti-static layer/Hard coat layer/Intermediate refractive index layer/High refractive index layer/Low-refractive-index layer Anti-static layer/Support/Hard coat layer/Intermediate refractive index layer/high refractive index layer/low-refractive-index layer Back coat layer/Support/Hard coat layer/High refractive index layer/Low-refractive-index layer/High refractive index layer/Low-refractive-index layer On the above hard coat layer, in order to have higher adhesion to the anti-reflection layer, a surface treatment, for example, disclosed in the specifications of JP-A Nos. 2002-182004, 2004-52028, Japanese Patent No. 3508342, JP-A Nos. 2002-139602 and 2002-282777, is preferably carried out. Examples of such a surface treatment include: a chemical treatment, a mechanical treatment, a corona discharge treatment, a flame treatment, a UV irradiation treatment, a high-frequency treatment, a glow discharge treatment, an active plasma treatment, an atmospheric pressure plasma treatment, a laser treatment, a mixed acid treatment, an alkali treatment, and an ozone oxidation treatment.

It is specifically preferable to carry out an atmospheric pressure plasma treatment as disclosed in, for example, JP-A Nos. 2000-327310, 2004-198458, 2003-328125, 2004-75738, 20004-198590 and 2005-163010.

On the low refractive index layer of the outermost surface, an antifouling layer may also be provided so that wiping of stain or a finger-print may become easy. As an antifouling layer, a fluorine-containing organic compound is used preferably.

The layer construction is not limited to these layer constructions as far as the reflectance can be reduced due to optical interference. Further, the anti-static layer preferably contain electrically conductive polymer particles (for example, cross-linked cation particles) or metal oxide particles (for example, $SnO_2$ and ITO), which can be applied by coating. Also, a metal oxide layer (for, example, ZnO, $SnO_2$ and ITO) can be formed via an atmospheric pressure plasma treatment or a plasma CVD method.

(Low Refractive Index Layer)

In the low refractive index layer used in the present invention, the following hollow silica particles are preferably used.

(Hollow Silica Particles)

Hollow particles are (I) complex particles constituted of a porous particle and a cover layer arranged on the surface of said porous particle or (II) hollow particles, the interior of which is hollow and the hollow is filled with contents such as a solvent, a gas or a porous substance. Herein, at least either (I) complex particles or (II) hollow particles is contained in a low refractive index layer, or the both of them may be contained.

Herein, hollow particles are particles the interior of which is hollow, and the hollow is surrounded by a particle wall. The interior of the hollow is filled with the contents such as a solvent, a gas or a porous substance which have been utilized in preparation. The mean particle diameter of such hollow particles is preferably in a range of 5-300 nm and preferably of 10-200 nm. The mean particle diameter of hollow particles utilized is appropriately selected depending on the thickness of the formed transparent cover film and is preferably in a range of $2/3$-$1/10$ of the layer thickness of the transparent cover film of such as a formed low refractive index layer. These hollow particles are preferably utilized in a state of being dispersed in a suitable medium to form a low refractive index layer. As dispersing medium, water, alcohol (such as methanol, ethanol and isopropanol), ketone (such as methyl ethyl ketone and methyl isobutyl ketone) and ketone alcohol (such as diacetone alcohol) are preferable.

A thickness of the cover layer of a complex particle or the thickness of the particle wall of a hollow particle is preferably in a range of 1-20 nm and more preferably in a range of 2-15 nm. In the case of a complex particle, when a thickness of the cover layer is less than 1 nm, a particle may not be completely covered to allow such as silicate monomer or oligomer having a low polymerization degree as a coating component described later to immerse into the interior of the complex particle resulting in decrease of porousness of the interior, whereby an effect of a low refractive index may not be obtained. Further, when a thickness of the cover layer is over 20 nm, the aforesaid silicate monomer or oligomer never immerses into the interior, however, the porosity (a micropour volume) of a complex particle may be decreased, resulting in an insufficient effect of a low refractive index. Further, in the case of a hollow particle, particle shape may not be kept when a thickness of the particle wall is less than 1 nm, while an effect of a low refractive index may not be obtained when a thickness of the particle wall is not less than 20 nm.

The cover layer of a complex particle or the particle wall of a hollow particle is preferably comprised of silica as a primary component. Further, components other than silica may be incorporated and specific examples include such as $Al_2O_3$, $B_2O_3$, $TiO_2$, $ZrO_2$, $SnO_2$, $CeO_2$, $P_2O_5$, $Sb_2O_3$, $MoO_3$, $ZnO_2$, and $WO_3$. A porous particle to constitute a complex particle includes those comprised of silica, those comprised of silica and an inorganic compound other than silica and those comprised of such as $CaF_2$, NaF, $NaAlF_6$ and $MgF$. Among them, specifically preferable is a porous particle comprised of a complex oxide of silica and an inorganic compound other than silica. An inorganic compound other than silica includes one type or at least two types of such as $Al_2O_3$, $B_2O_3$, $TiO_2$, $ZrO_2$, $SnO_2$, $CeO_2$, $P_2O_3$, $Sb_2O_3$, $MoO_3$, $ZnO_2$ and $WO_3$. In such a porous particle, mole ratio $MO_x/SiO_2$ is preferably in a range of 0.0001-1.0 and more preferably of 0.001-0.3 when silica is represented by $SiO_2$ and an inorganic compound other than silica is represented by an equivalent oxide ($MO_x$). A porous particle having mole ratio $MO_x/SiO_2$ of less than 0.0001 is difficult to be prepared and the pore volume is small to unable preparation of a particle having a low refractive index. Further, when mole ratio $MO_x/SiO_2$ of a porous particle is over 1.0, the pore volume becomes large due to a small ratio of silica and it may be further difficult to prepare a particle having a low refractive index.

A pore volume of such a porous particle is preferably in a range of 0.1-1.5 ml/g and more preferably of 0.2-1.5 ml/g. When the pore volume is less than 0.1 ml/g, a particle having a sufficiently decreased refractive index cannot be prepared, while, when it is over 1.5 ml/g, strength of a particle is decreased and strength of the obtained cover film may be decreased. Herein, the pore volume of such a porous particle can be determined by a mercury pressurized impregnation method. Further, a content of a hollow particle includes such as a solvent, a gas and a porous substance which have been utilized at preparation of the particle. In a solvent, such as a non-reacted substance of a particle precursor which is utilized at hollow particle preparation and a utilized catalyst may be contained. Further, a porous substance includes those comprising compounds exemplified in the aforesaid porous particle. These contents may be those containing single component or mixture of plural components.

As a manufacturing method of such hollow particles, a preparation method of complex oxide colloidal particles, disclosed in paragraph Nos. [0010]-[0033] of JP-A No. 7-133105, is suitably applied.

The refractive index of the resulting hollow particle is low because of the hollow structure, and the refractive index of the resulting hollow particle in the present invention is preferably 1.30-1.50, and more preferably 1.35-1.44.

The content (by weight) of hollow silica particles having an outer layer as well as pores or cavities in a low refractive index layer coating liquid is 10-80% by weight, and more preferably 20-60% by weight.

(Tetraalcoxy Silane Compound or Hydrolysate Thereof)

A tetraalcoxy silane compound or its hydrolysate as a sol-gel material is preferably contained in a low refractive index layer usable in the present invention.

As components for the low refractive index layer usable in the present invention, organic group-containing silicon oxides other than the foregoing inorganic silicon oxides are preferably usable. These are generally called sol-gel components. Preferably employed as such sol-gel components may be metal alcolates, and organoalkoxy metal compounds and hydrolysis products thereof. Particularly preferred are alkoxysilane, and hydrolysis products thereof. It is also preferable to use tetraalkoxysilane (tetramethoxysilane and tetraethoxysilane), alkyltrialkoxysilane (methyltrimethoxysilane, and ethyltrimethoxysilane), aryltrialkoxysilane (phenyltrimethoxysilane), dialkyldialkoxysilane, diaryldialkoxysilane, and the like.

It is preferred that the low refractive index layer usable in the present invention contains the foregoing silicon oxide and the following silane coupling agent.

Specific examples of silane coupling agents include methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, and phenyltriacetoxysilane.

Further, examples of silane coupling agents having two alkyl substituents for silicon include dimethyldimethoxysilane, phenylmethyldimethoxysilane, dimethyldiethoxysilane, and phenylmethyldiethoxysilane.

Specific examples of silane coupling agents produced by Shin-Etsu Chemical Co., Ltd include KBM-303, KBM-403, KBM-402, KBM-403, KBM-1403, KBM-502, KBM-503, KBE-502, KBE-503, KBM-603, KBE-603, KBM-903, KBE-903, KBE-9103, KBM-802 or KBM-803.

It is preferred that the silane coupling agent is hydrolyzed with a predetermined amount of water in advance. When a silane coupling agent is hydrolyzed, the surface of the foregoing silicon oxide particle or the silicon oxide particle containing an organic group is easy to be reactive, resulting in formation of strengthened films. The silane coupling agent which has been hydrolyzed may also be added into a coating liquid in advance.

It is also preferable that the low refractive index layer incorporates polymers in an amount of 5-50 percent by weight. The above polymers exhibit functions such that particles are subjected to adhesion and the structure of the above low refractive index layer is maintained. The used amount of the polymers is controlled so that without filing voids, it is possible to maintain the strength of the low refractive index layer. The amount of the polymers is preferably 10-30 percent by weight of the total weight of the low refractive index layer. In order to achieve adhesion of particles employing polymers, it is preferable that (1) polymers are combined with surface processing agents of particles, (2) a polymer shell is formed around a particle used as a core, or (3) polymers are employed as a binder among particles.

Binder polymers are preferably polymers having saturated hydrocarbon or polyether as a main chain, but is more preferably polymers having saturated hydrocarbon as a main chain. The above binder polymers are subjected to crosslinking. It is preferable that the polymers having saturated hydrocarbon as a main chain is prepared employing a polymerization reaction of ethylenic unsaturated monomers. In order to prepare crosslinked binder polymers, it is preferable to employ monomers having at least two ethylenic unsaturated groups. Listed as examples of monomers having at least two ethylenic unsaturated groups are esters of polyhydric alcohol with (meth)acrylic acid (for example, ethylene glycol di(meth)acrylate, 1,4-dicyclohexane diacrylate, pentaerythritol tetra(meth)acrylate, pentaerythritol(meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, 1,2,3-cyclohexane tetramethacrylate, polyurethane polyacrylate, and polyester polyacrylate); vinylbenzene and derivatives thereof (for example, 1,4-divinylbenzene and 4-vinylbenzoic acid-2-acryloylethyl ester, and 1,4-divinylcyclohexane); vinylsulfones (for example, divinylsulfone); acrylamides (for example, methylenebisacrylamide); and methacrylamides.

The low refractive index layers may be a low refractive index layer formed by crosslinking of a fluorine containing resin which undergo crosslinking via heating or ionizing radiation (hereinafter referred to as "fluorine containing resins prior to crosslinking").

Preferably listed as fluorine containing resins prior to coating are fluorine containing copolymers which are formed employing a fluorine containing vinyl monomer and a monomer which provides a crosslinking group. Listed as specific examples of the above fluorine containing vinyl monomer units include: fluoroolefins (for example, fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid (for example, BISCOAT 6FM (produced by Osaka Organic Chemical Industry Ltd.) and M-2020 (produced by Daikin Industries, Ltd.), and completely or partially fluorinated vinyl ethers. Listed as monomers to provide a crosslinking group are vinyl monomers previously having a crosslinking functional group in the molecule, such as glycidyl methacrylate, vinyltrimethoxysilane, γ-methacryloyloxypropyltrimethoxysilane, or vinyl glycidyl ether, as well as vinyl monomers having a carboxyl group, a hydroxyl group, an amino group, or a sulfone group (for example, (meth)acrylic acid, methylol(meth)acrylate, hydroxyalkyl (meth)acrylate, allyl acrylate, hydroxyalkyl vinyl ether, and hydroxyalkyl allyl ether). JP-A Nos. 10-25388 and 10-147739 describe that a crosslinking structure is introduced into the latter by adding compounds having a group which reacts with the functional group in the polymer and at least one reacting group. Listed as examples of the crosslinking group are a acryloyl, methacryloyl, isocyanate, epoxy, aziridine, oxazoline, aldehyde, carbonyl, hydrazine, carboxyl, methylol or active methylene group. When fluorine containing polymers undergo thermal crosslinking due to the presence of a thermally reacting crosslinking group or the combinations of an ethylenic unsaturated group with thermal radical generating agents or an epoxy group with a heat generating agent, the above polymers are of a heat curable type. On the other hand, in cases in which crosslinking undergoes by exposure to radiation (preferably ultraviolet radiation and electron beams) employing combinations of an ethylenic unsaturated group with photo-radical generating agents or an epoxy group with photolytically acid generating agents, the polymers are of an ionizing radiation curable type.

The ratio of each monomer to form the fluorine containing copolymers prior to coating is as follows. The ratio of fluorine containing vinyl monomers is preferably 20-70 mol percent, but is more preferably 40-70 mol percent; the ratio of monomers to provide a crosslinking group is preferably 1-20 mol percent, but is more preferably 5-20 mol percent, and the ratio of the other monomers simultaneously employed is preferably 10-70 mol percent, but is more preferably 10-50 mol percent.

The low refractive index layer usable in the present invention can be formed via coating, employing a dip coat method, an air knife coat method, a curtain coat method, a roller coat method, a wire bar coat method, a gravure coat method, or an extrusion coat method (U.S. Pat. No. 2,681,294). Two or more layers may be applied simultaneously. The method of simultaneous application is described in, for example, U.S. Pat. Nos. 2,761,791, 2,941,898, 3,508,947, 3,526,528 and "Yuji Harasaki: Coating Engineering, p. 253 (1973), published by Asakura Publishing Co., Ltd."

The low refractive index layer usable in the present invention preferably has a thickness of 50-200 nm, and more preferably has a thickness of 60-150 nm.

(High Refractive Index Layer and Medium Refractive Index Layer)

A high refractive index layer is preferably arranged between a transparent support and a low refractive index layer. Further, to arrange a medium refractive index layer between a transparent substrate and a high refractive index layer is preferred to reduce the reflectance. A refractive index of a high refractive index layer is preferably 1.55-2.30 and more preferably 1.57-2.20. A refractive index of a medium refractive index layer is adjusted to be an intermediate value between a refractive index of a transparent support and a refractive index of a high refractive index layer. A refractive index of a medium refractive index layer is preferably 1.55-1.80. Thickness of a high refractive index layer and a medium refractive index layer is preferably 5 nm -1 μm, more preferably 10 nm-0.2 μm and most preferably 30 nm -0.1 μm. The haze of a high refractive index layer and a medium refractive index layer is preferably not more than 5%, more preferably not more than 3% and most preferably not more than 1%. The strength of a high refractive index layer and a medium refractive index layer is preferably not less than H based on pencil hardness at a loading weight of 1 kg, more preferably not less than 2H and most preferably not less than 3H.

It is preferable that the medium and high refractive index layers in the present invention are formed in such a manner that a coating liquid containing a monomer or oligomer of an organic titanium compound represented by following Formula (1), or hydrolyzed products thereof are coated and subsequently dried, and the resulting refractive index is 1.55-2.5.

$$Ti(OR_1)_4 \qquad \text{Formula (1)}$$

where $R_1$ is an aliphatic hydrocarbon group having 1-8 carbon atoms, but is preferably an aliphatic hydrocarbon group having 1-4 carbon atoms. Further, in monomers or oligomers of organic titanium compounds or hydrolyzed products thereof, the alkoxide group undergoes hydrolysis to form a crosslinking structure via reaction such as —Ti—O—Ti, whereby a cured layer is formed.

Listed as preferred examples of monomers and oligomers of organic titanium compounds are dimers—decamers of $Ti(OCH_3)_4$, $Ti(OC_2H_5)_4$, $Ti(O\text{-}n\text{-}C_3H_7)_4$, $Ti(O\text{-}i\text{-}C_3H_7)_4$, $Ti(O\text{-}n\text{-}C_4H_9)_4$, and $Ti(O\text{-}n\text{-}C_3H_7)_4$, dimers—decamers of $Ti(O\text{-}i\text{-}C_3H_7)_4$ and dimers—decamers of $Ti(O\text{-}n\text{-}C_4H_9)_4$. These may be employed singly or in combination of at least two types. Of these, specifically preferred are dimers—decamers of $Ti(O\text{-}n\text{-}C_3H_7)_4$, $Ti(O\text{-}i\text{-}C_3H_7)_4$, $Ti(O\text{-}n\text{-}C_4H_9)_4$, and $Ti(O\text{-}n\text{-}C_3H_7)_4$. and dimers—decamers of $Ti(O\text{-}n\text{-}C_4H_9)_4$.

The content of monomers and oligomers of organic titanium compounds, as well as hydrolyzed products thereof is preferably 50.0-98.0% by weight with respect to solids incorporated in the liquid coating composition. The solid ratio is more preferably 50-90% by weight, but is still more preferably 55-90% by weight. Other than these, it is preferable to incorporate polymers of organic titanium compounds (which are subjected to hydrolysis followed by crosslinking) in a liquid coating composition, or to incorporate titanium oxide particles.

The high refractive index and medium refractive index layers preferably usable in the present invention may incorporate metal oxide particles as particles and further may incorporate binder polymers.

In the above method of preparing a coating liquid, when hydrolyzed/polymerized organic titanium compounds and metal oxide particles are combined, both strongly adhere to each other, whereby it is possible to obtain a strong coating layer provided with hardness and flexibility in evenly coated layer.

The refractive index of metal oxide particles employed in the high and medium refractive index layers is preferably 1.80-2.80, but is more preferably 1.90-2.80. The weight average diameter of the primary particle of metal oxide particles is preferably 1-150 nm, is more preferably 1-100 nm, but is most preferably 1-80 nm. The weight average diameter of metal oxide particles in the layer is preferably 1-200 nm, is more preferably 5-150 nm, is still more preferably 10-100 nm, but is most preferably 10-80 nm. Metal oxide particles at an average particle diameter of at least 20-30 nm are determined employing a light scattering method, while the particles at a diameter smaller than 20-30 nm are determined employing electron microscope images. The specific surface area of metal oxide particles is preferably 10-400 m²/g as a value determined employing the BET method, is more preferably 20-200 m²/g, but is most preferably 30-150 m²/g.

Examples of metal oxide particles are metal oxides containing at least one element selected from the group consisting of Ti, Zr, Sn, Sb, Cu, Fe, Mn, Pb, Cd, As, Cr, Hg, Zn, Al, Mg, Si, P, and S. Specifically listed are titanium dioxide, (for example, rutile, rutile/anatase mixed crystals, anatase, and amorphous structures), tin oxide, indium oxide, zinc oxide, and zirconium oxide. Of these, titanium oxide, tin oxide, and indium oxide are particularly preferred. Metal oxide particles are composed of these metals as a main component of oxides and are capable of incorporating other metals. Main component, as described herein, refers to the component of which content (in percent by weight) is the maximum in the particle composing components. Listed as examples of other elements are Ti, Zr, Sn, Sb, Cu, Fe, Mn, Pb, Cd, As, Cr, Hg, Zn, Al, Mg, Si, P and S.

It is preferable that metal oxide particles are subjected to a surface treatment. It is possible to perform the surface treatment employing inorganic or organic compounds. Listed as examples of inorganic compounds used for the surface treatment are alumina, silica, zirconium oxide, and iron oxide. Of these, alumina and silica are preferred. Listed as examples of organic compounds used for the surface treatment are polyol, alkanolamine, stearic acid, silane coupling agents, and titanate coupling agents. Of these, silane coupling agents are most preferred.

A ratio of metal oxide particles in the high and medium refractive index layers is preferably 5-95% by volume, more preferably 20-90% by volume and still more preferably 40-85% by volume.

The above-described metal oxide particles are supplied to a coating liquid, which forms a high refractive index layer, in a state of dispersion being dispersed in a medium. As a dispersion medium of metal oxide particles, preferable is a liquid having a boiling point of 60-170 ° C. Specific examples of a dispersion medium include water, alcohol (such as methanol, ethanol, isopropanol, butanol and benzylalcohol), ketone (such as acetone, methyl ethyl ketone, methyl isobutyl ketone and cyclohexanone), ketone alcohol (such as diacetone alcohol), ester (such as methyl acetate, ethyl acetate, propyl acetate, butyl acetate, methyl formate, ethyl formate, propyl formate and butyl formate), aliphatic hydrocarbon (such as hexane and cyclohexane), hydrocarbon halogenide (such as methylene chloride, chloroform and carbon tetrachloride), aromatic hydrocarbon (such as benzene, toluene and xylene), amide (such as dimethylformamide, dimethylacetamide and n-methylpyrrolidone), ether (such as diethyl ether, dioxane and tetrahydrofuran) and ether alcohol (such as 1-methoxy-2-propanol). Among them, toluene, xylene, methyl ethyl ketone, methyl isobutyl ketone, cyclohexanone and butanol are specifically preferable.

Further, metal oxide particles can be dispersed in a medium by use of a homogenizer. Examples of a homogenizer include a sand grinder mill (for example, a beads mill equipped with a pin), a high speed impeller mill, a baffle mill, a roller mill, an atliter and a colloidal mill. A sand grinder mill and a high speed impeller mill are specifically preferable. Further, a preliminary dispersion may be performed. Examples of a homogenizer utilized in a preliminary dispersion include a ball mill, a three-roll mill, a kneader and an extruder.

In a high refractive index layer and a medium refractive index layer usable in the present invention, polymer having a cross-linked structure (hereinafter, also referred to as cross-linked polymer) is preferably utilized as binder polymer. Examples of cross-linked polymer include cross-linked compounds of polymer provided with a saturated hydrocarbon chain such as polyolefin, polyether, polyurea, polyurethane, polyester, polyamine, polyamide and melamine resin. Among them preferable are cross-linked compounds of polyolefin, polyether and polyurethane, more preferable are cross-linked compounds of polyolefin and polyether, and most preferably is cross-linked compound of polyolefin.

In the present invention, examples of monomer having at least two ethylenic unsaturated groups include ester of polyhydric alcohol and (meth)acrylic acid (such as ethyleneglycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri (meth)acrylate, dipentaerythritol tetra(meth)acrylate, dipentaerythritol penta(meth)acrylate, pentaerythritol hexa(meth) acrylate, 1,2,3-cyclohexane tetramethacrylate, polyurethane polyacrylate and polyester polyacrylate), vinylbenzene and derivatives thereof (such as 1,4-divinylbenzene, 4-vinylbenzoic acid-2-acryloyl ethylester, and 1,4-divinylcyclohexanone), vinyl sulfone (such as divinyl sulfone), acrylamide (such as methylene bisacrylamide) and methacrylamide. As monomer having an anionic group and monomer having an amino group or a quaternary ammonium group, monomer available on the market may be utilized. Monomer having an anionic group which is available on the market and preferably utilized includes Kayamar PM-21 and PM-2 (manufactured by Nippon Kayaku Co., Ltd.); Antox MS-60, MS-2N and MS-NH4 (manufactured by Nippon Nyukazai Co., Ltd.); Anilox M-5000, M-6000 and M-8000 series (manufactured by Toagosei Co., Ltd.); Viscoat #2000 series (manufactured by Osaka Organic Chemical Industry Ltd.); Newfrontier GX-8289 (manufactured by Dai-Ichi Kogyo Seiyaku Co., Ltd.); NK Ester CB-1 and A-SA (manufactured by Shin-Nakamura Chemical Co., Ltd.); and AR-100, MR-100 and MR-200 (manufactured by Dai-Hachi Chemical Industry Co., Ltd.). Further, monomer having an amino group or a quaternary ammonium group which is available on the market and preferably utilized includes DMAA (manufactured by Osaka Organic Chemical Industry Ltd.); DMAEA and DMAPAA (manufactured by Kohjin Co., Ltd.); Blemer QA (manufactured by Nippon Oil & Fat Co., Ltd.); and NewFrontier C-1615 (manufactured by Dai-Ichi Kogyo Seiyaku Co., Ltd.).

As a polymerization reaction of polymer, a photopolymerization reaction or a thermal polymerization reaction can be utilized and the former is specifically preferable. A polymerization initiator is preferably utilized. A polymerization initiator includes the above-described thermal polymerization initiator and photopolymerization initiator utilized to form binder polymer of the actinic ray curable resin layer.

As a polymerization initiator, those available on the market may be utilized. A polymerization accelerator may be utilized in addition to a polymerization initiator. The addition amount of a polymerization initiator and a polymerization accelerator is preferably in the range of 0.2-10 weight % based on the total amount of monomer.

Added to each of the anti-reflection layers or the coating liquid compositions thereof may be polymerization inhibitors, leveling agents, thickeners, anti-coloring agents, UV absorbents, silane coupling agents, antistatic agents, and adhesion providing agents, other than the foregoing components such as metal oxide particles, polymers, dispersion media, polymerization initiators and polymerization accelerators.

In order to accelerate hydrolysis or curing of a composition containing metal alkoxide, irradiation of actinic radiation is preferable, after coating a medium or high refractive index layer usable in the present invention, or a low refractive index layer. Exposure to actinic radiation each time after a layer is coated is more preferable.

The abovementioned actinic rays represent ultraviolet rays, electron beams or y rays and an energy source which activates a compound is usable without limitation., however, preferably usable is ultraviolet rays or electron beams. Ultraviolet rays are specifically preferred since handling is easy and a high level of energy can be easily obtained. Any light source capable of generating the ultraviolet ray can be used as the light source of the ultraviolet ray for causing photo-polymerization of ultraviolet ray reactive compound. For example, it is possible to use a low pressure mercury lamp, an intermediate pressure mercury lamp, a high pressure mercury lamp, an extra-high pressure mercury lamp, a carbon arc light, a metal halide lamp and an xenon lamp. Further, ArF excimer laser, KrF excimer laser, an excimer lamp and synchrotron radiation can also be used. The condition of irradiation is different depending on the type of the lamp, however, the preferred amount of irradiation is 20-10,000 mJ/cm$^2$. more preferably 100-2000 mJ/cm$^2$, and still more preferably 400-2000 mJ/cm$^2$.

(Polarizing Plate)

It is possible to prepare the polarizing plate usable in the present invention, employing a common method. It is preferable that the rear surface of the anti-glare anti-reflection film according to the present invention is saponified and then is adhered to at least one surface of a polarizer film which has been prepared via alkali saponification, immersion in an iodine solution and stretching, employing an aqueous solution of completely saponified polyvinyl alcohol as an adhesive. On the other surface of the polarizer film, either the aforesaid film or another appropriate polarizing plate protective film may be employed. Preferably employed are commercially available cellulose ester films (for example, KONICA MINOLTA TAC KC8UX, KC4UX, KC5UX, KC8UCR-3, KC8UCR-4, KC8UCR5, KC8UY, KC4UY, KC12UR, KV8UY-HA, and KV8UX-RHA, all produced by Konica Minolta Opto, Inc.). The polarizing plate protective film used on another surface of the polarizer film opposite to the anti-glare anti-reflection film preferably has the in-plane retardation Ro of 20-70 nm and Rt of 100-400 nm at a wavelength of 590 nm. These films can be prepared, for example, by the method disclosed in JP-A Nos. 2002-71957 and 2003-170492. Alternatively, it is also preferable to prepare a polarizing plate protective film which also has a function of an optical compensation film by incorporating an optical anisotropic layer obtained by orienting liquid crystal compounds such as discotic liquid crystals. An optically anisotropic layer can be prepared, for example, by the method disclosed in JP-A No. 2003-98348. By using such a film in combination with the anti-glare anti-reflection film according to the present invention, a polarizing plate exhibiting an excellent flatness and a stable viewing angle enlarging effect can be obtained.

A polarizer film, which is a main component of the polarizing plate, is an element which transmits polarized light in only prescribed direction. A currently known representative polarizer film is a polyvinyl alcohol polarizer film. Two types of polyvinyl alcohol polarizer films are known, namely, one is stained with iodine and the other is stained with a dichroic dye. A polarizer film is prepared in such a manner that an aqueous polyvinyl alcohol solution is cast to form a film and then the film is uniaxially stretched, followed by dying, or the film is stained with a dye first and then uniaxially stretched, followed by carrying out a durability enhancing treatment employing a boron compound. The anti-glare anti-reflection film according to the present invention is adhered on the surface of the polarizer film to form a polarizing plate. It is preferable to carry out the above adhesion employing an aqueous adhesive containing a completely saponified polyvinyl alcohol as the main component.

The polarizing plate using a conventional anti-glare anti-reflection film was not sufficient in flatness, and fine corrugations were observed in a reflected image from the screen. The corrugations in the reflected image increased after a durability test under the condition of 60 ° C. and 90% RH. On the contrary, the polarizing plate employing the anti-glare anti-reflective film of the present invention showed an excellent flatness and no corrugation was observed even after a durability test under the condition of 60° C. and 90% RH.

(Liquid Crystal Display)

Various displays each exhibiting an excellent visibility can be fabricated by incorporating the polarizing plate according to the present invention. The anti-glare anti-reflection film of the present invention is preferably employed in a reflection type, transmission type, or semi-transmission type LCD, or in various mode driving system LCDs such as TN mode, STN mode, OCB mode, HAN mode, VA mode (for example, a PVA type and an MVA type), or IPS mode. It is also preferably used in varieties of displays such as a plasma display, a field emission display, an organic EL display, an inorganic EL display and an electronic paper. Specifically, in large screen display devices of at least 30 type, specifically 30-54 type, no white spot phenomenon is observed in the periphery of a display, and such a effect is maintained for an extended period of time. Specifically in an MVA mode display, a notable effect is obtained. Further, color shading, glare, and wavy unevenness are minimized, resulting in reducing eye fatigue even after long time viewing.

EXAMPLES

The present invention is described referring examples below, but the present invention is not limited thereto.

Example 1

[Preparation of Anti-Glare Anti-Reflection Film]
(Preparation of Cellulose Triacetate Film 1)
Transparent cellulose triacetate film 1 was prepared by using the following dope composition 1.
<Dope Composition 1>

| | |
|---|---|
| Cellulose triacetate (Average acetylation degree: 62.0%) | 100 parts by mass |
| Plasticizer (Trimethylolpropane tribenzoate) | 5 parts by mass |
| Plasticizer (Ethylphthalylethyl glycolate) | 5 parts by mass |
| UV absorbent (2-[5-chloro(2H)-benzotriazole-2-yl]-4-methyl-6-(t-butyl)phenol) | 1 part by mass |
| UV absorbent (2-[(2H)-benzotriazole-2-yl]-4,6-di-t-pentylphenol) | 1 part by mass |
| Particle (Aerogil R972V, Nippon Aerosil Co., Ltd.) | 0.3 parts by mass |
| Methylene chloride | 430 parts by mass |
| Ethanol | 90 parts by mass |

The above composition was charged into a sealable vessel and completely dissolved by stirring under high pressure while maintaining at 80° C. to obtain a dope composition.

The dope composition was filtered and cooled, and uniformly cast on a stainless steel band while keeping at 33° C. The solvent was evaporated on the stainless steel band until the residual content of the solvent became 80% and then the film was peeled from the stainless steel band. The solvent remaining in the peeled web of cellulose triacetate film was evaporated at 50° C., and the film was slit into 1.7 m width and then stretched by 1.1 times at 120° C. in TD direction (the direction perpendicular to the transporting direction of the film) by a tenter. The residual solvent content at the beginning of the stretching by the tenter was 20%. The film was treated at high temperature while transferring by many rollers in a heating zone until the residual solvent content became 0.1%, slit into 1.5 m width, subjected to knurling treatment at the both edges and wound up. Thus cellulose triacetate film 1 having a thickness of 50 μm was obtained.

(Coating of Hard-Coat Layer 1)

The following hard-coat layer coating liquid 1 was coated on the above obtained cellulose triacetate film 1 by a die coater so that the dry layer thickness was made 10 μm and dried until the residual solvent in the hard-coat layer became 2%. After that, convexoconcave patters were formed on the hard-coat layer by using the convexoconcave pattern forming apparatus shown in FIG. 7.

<Hard-Coat Layer Coating Liquid 1>

The following materials were mixed to prepare a hard-coat layer coating liquid 1.

| | |
|---|---|
| Acryl monomer, Kayarad DPHA (Dipentaerythritol hexaacrylate) | 226 parts by mass |
| Irgacure 184 (Ciba Specialty Chemicals Inc.) | 25 parts by weigh |
| BYK-331 (Bic Chemy Japan Co., Ltd.) | 0.25 parts by mass |
| Propyleneglycol monomethyl ether | 101 parts by mass |
| Ethyl acetate | 101 parts by mass |

(Formation of Convexoconcave Patterns)

The surface of the above film was roughened by pressing with the convexoconcave surface of the following convexoconcave roller.

<Convexoconcave Roller 1>

Convexoconcave roller 1: Quartz hollow roller shown in FIG. 7.

Convexoconcave surface having a surface roughness of 0.5 μm was formed; the shape of the cross section of the convexoconcave surface was that shown in FIG. 5(A); the diameter and the width of the roller were each 300 mm and 1.4 m, respectively.

The convexoconcave shape of the surface of the quartz glass hollow roller was formed by the following procedure.

A quartz glass roller was subjected to sandblasting treatment using monodispersed alumina crystals Sumicorundum AA-5m, manufactured by Sumitomo Chemical Co., Ltd., (average particle diameter: 5 μm) while rotating and swinging. The blasting pressure and time were each 500 kPa and 60 seconds, respectively. The quartz roller after the sandblasting treatment was washed by ultrasonic wave washing and immersed into 10% by mass hydrofluoric acid for 1200 seconds at 40° C., and sufficiently washed by purified water and dried to prepare the quartz glass hollow convexoconcave roller.

Light source and conditions of UV irradiation; High pressure mercury lamp HN-64NL, manufactured by Nippon Denchi Co., Ltd., 500 mJ/cm$^2$, 15 seconds Arrangement: Refer to FIG. 7

Atmosphere near the patterned roller 1: Nitrogen gas blown through gas blowing ducts 28 and 28'

[Coating of Anti-Reflection Layer]

The refractive index of the anti-reflection layer was measured as follows.

(Refractive Index)

The refractive index of each refractive index layer was determined using a sample in which one of the refractive index layers was individually formed on the hard coat layer described below using the result of spectral reflectance by a spectral photometer. The opposite side of the sample to be measured was roughened and treated by a black spray for preventing the reflection at the back surface and the reflectance was measured at a direct reflection at 5° in the visible wavelength range (400 to 700 nm) by a spectral photometer U-4000, manufactured by Hitachi Ltd.

(Coating of Intermediate and Low Refractive Index Layers)

The following intermediate refractive index layer coating liquid 1 and low refractive index layer coating liquid 1 were coated on the hard-coat layer of the above film and irradiated with UV rays and dried to prepare an anti-glare anti-reflection film 1.

<Coating of Intermediate Refractive Index E Layer Coating Liquid 1>

The following materials were stirred and mixed to prepare an intermediate refractive index layer coating liquid 1.

| | |
|---|---|
| Electroconductive zinc antimonate particle dispersion Celnax CX-Z610M-F2 (Nissan Chemical Industries Ltd., solvent: MeOH, solid content: 60%) | 52 parts by mass |
| Dipentaerythritol haxaacrylate (Matrix) | 9 parts by mass |
| Irugacure 184 (Photopolymerization initiator) | 1.5 parts by mass |
| Irugacure 907 (Ciba Specialty Chemicals Inc., photopolymerization initiator) | 0.8 parts by mass |
| Propyleneglycol monomethyl ether (PGME) | 250 parts by mass |
| Isopropyl alcohol (IPA) | 500 parts by mass |
| Methyl ethyl ketone (MEK) | 180 parts by mass |
| BYK-UV3510 (Bic Chemy Japan) | 0.3 parts by mass |

The thickness and the refractive index of the intermediate refractive index layer were each 120 nm and 1.62, respectively.

<Low Refractive Index Layer Coating Liquid 1>

The following materials were stirred and mixed to prepare a low refractive index layer coating liquid 1.

| | |
|---|---|
| The following tetraethoxysilane hydrolysis product A | 123 parts by mass |
| The following silica hollow particle dispersion | 18 parts by mass |
| γ-methacryloxypropyltrimethoxysilane (KBM603, Shin-Etsu Chemical Co., Ltd.) | 4 parts by mass |
| FZ-2222 (10% solution in propyleneglycol monomethyl ether, Nippon Unicar Co., Ltd.) | 0.2 parts by mass |
| Acetic acid | 3.5 parts by mass |
| Isopropyl alcohol (IPA) | 425 parts by mass |
| Propyleneglycol monomethyl ether (PGME) | 425 parts by mass |
| Aluminum ethylacetoacetate diisopropylate | 0.3 parts by mass |

The thickness and the refractive index of the low refractive layer were each 95 nm and 1.37, respectively.

(Preparation of Tetraethoxysilane Hydrolysis Product A)

Two hundreds and thirty grams of tetraethoxysilane and 440 g of ethanol were mixed and 100 g of an aqueous solution of acetic acid (10%) was added to the mixture and then stirred for 28 hours at 25 ° C. to prepare tetraethoxysilane hydrolysis product A.

(Preparation of Silica Hollow Particle Dispersion)

A mixture of 100 g of silica sol having an average particle diameter of 5 nm and a $SiO_2$ concentration of 20% and 1,900 g of purified water was heated by 80° C. The pH of the reaction mother liquid was 10.5. To the mother liquid, 9,000 g of an aqueous solution of sodium silicate having a concentration of 0.98% in terms of $SiO_2$ and 9,000 g of an aqueous solution of sodium aluminate having a concentration of 1.02% in terms of $Al_2O_3$ were simultaneously added while keeping the reacting temperature at 80° C. The pH value of the reacting liquid was raised by 12.5 just after the addition and almost not varied after that. The reacting liquid was cooled by room temperature after completion of the addition and washed using an ultrafiltration membrane to prepare $SiO_2.Al_2O_3$ nuclear particle dispersion having a solid concentration of 20% (Process (a)).

To 500 g of thus obtained nuclear particle dispersion, 1,700 g of purified water was added and heated by 98° C., and then 3,000 g of a silicic acid solution with a $SiO_2$ concentration of 3.5% prepared by de-alkalizing a sodium silicate aqueous solution by cationic ion exchanging resin was added while keeping 98° C. to obtain a dispersion of the nuclear particles on each of which the first silica covering layer was formed (Process (b)).

The resultant dispersion was washed by using an ultrafiltration membrane so as to make the solid concentration to 13%. After that, 1125 g of purified water was added to 500 g of the above obtained the dispersion of the nuclear particles on each of which the first silica covering layer was formed and then the pH value was adjusted to 1.0 by dropping concentrated hydrochloric acid (35.5%) for aluminum elimination treatment. Then dissolved aluminum salt was separated by the ultrafiltration membrane while adding 10 L of an aqueous hydrochloric acid solution having a pH of 3 and 5L of purified water to prepare a dispersion of porous particles of $SiO_2.Al_2O_3$ which were formed by eliminating a part of the constitution element of the nuclear particle having the first silica covering layer (Process (c)). A mixture of 1,500 g of the above porous particle dispersion, 500 g of purified water, 1,750 g of ethanol and 626 g of 28% ammonia water was heated by 35° C. and 104 g of ethyl silicate ($SiO_2$: 28%) was added to the mixture to form the second silica covering layer by covering the surface of the porous particle having the first silica covering layer with the polycondensate of hydrolysis product of ethyl silicate. Then the solvent was replaced by ethanol by applying the ultrafiltration membrane to prepare a dispersion of silica hollow particles having a solid concentration of 20%.

In the silica hollow particles had a thickness of the first silica covering layer of 3 nm, an average diameter of 47 nm, a $MO_x/SiO_2$ mole ratio of 0.0017 and a refractive index of 1.28. The average particle diameter was measured by dynamic light scattering method.

[Preparation of Anti-Glare Anti-Reflection Film 2]

An anti-glare anti-reflection film 2 was prepared in the same manner as in anti-glare anti-reflection film 1 except that a cellulose triacetate film 2 was used instead of the cellulose triacetate film 1. The cellulose triacetate film 2 was the same as the cellulose triacetate film 1 except that the surface opposite to the surface on which the hard-coat layer to be formed was roughened by the following convexoconcave apparatus at the portion in FIG. 1.

(Formation of Convexoconcave)

The surface opposite to the surface on which the hard-coat layer to be formed was roughened by pressing to the convexoconcave surface of the convexoconcave roller. The residual solvent content of the web was 120% by mass.

(Convexoconcave Roller 2)

Convexoconcave roller 2: A roller on the surface of which convexoconcave patterns having a height difference of 1.5 μm and a pitch of projections of 15 μm was formed by a laser; the shape of cross section of the convexoconcave patterns was FIG. 5(A); the diameter and the width were each 100 mm and 1.4 m, respectively; the material was ion plated with amorphous chromium (as to the shape of the roller, refer to FIG. 4). A rubber roller was used as the back-roller facing to the convexoconcave roller.

[Preparation of Anti-Glare Anti-Reflection Film 3]

An anti-glare anti-reflection film 3 was prepared in the same manner as in the anti-glare anti-reflection film 2 except that the surface opposite to the surface on which the hard-coat layer to be coated was roughened by a convexoconcave roller 3 in place of the convexoconcave roller 2 and the hard-coat surface was roughened by a convexoconcave roller 4 in place of the convexoconcave roller 1. The convexoconcave roller 3 was the same as the convexoconcave roller 2 except that the height difference and the pitch of the projection were each changed to 3 μm and 30 μm, respectively, and the convexoconcave roller 4 is the same as the convexoconcave roller 1 except that the surface roughness was varied to 1.0 μm by varying the sandblasting condition.

[Preparation of Anti-Glare Anti-Reflection Film 4]

An anti-glare anti-reflection film 4 was prepared in the same manner as in the anti-glare anti-reflection film 1 except that cellulose triacetate film 4 was used, which was roughened on the surface on which the hard-coat layer to be provided at the position shown in FIG. 1 by a convexoconcave roller 5, the coating, drying and UV irradiation of the hard coat layer were carried out downwards so as that the shape of the film surface was easily reproduced on the surface of the hard-coat layer, and the roughening treatment onto the hard-coat layer was omitted.

(Formation of Convexoconcave Patterns)

The side of the film on which the hard-coat layer to be coated was roughened by pressing to the following convexoconcave roller. The residual solvent content of the web was 120% by mass.

<Convexoconcave Roller 5>

Convexoconcave roller 5: A roller on the surface of which convexoconcave patterns having a height difference of 3 μm and a pitch of projections of 10 μm was formed by a laser; the shape of cross section of the convexoconcave patterns was FIG. 5(A); the diameter and the width were each 100 mm and 1.4 m, respectively; the material was ion plated with amorphous chromium (as to the shape of the roller, refer to FIG. 4). A rubber roller was used as the back-roller facing to the convexoconcave roller.

[Preparation of Anti-Glare Anti-Reflection Films 5 to 12]

Anti-glare anti-reflection films 5 to 12 were prepared in the same manner as in the anti-glare anti-reflection film 4 except that a convexoconcave surface was formed on the cellulose triacetate film 4 according to the following conditions and the thickness of the film was varied as listed in Table 1.

(Formation of Convexoconcave Patterns)

The surface opposite to the surface to be coated by the hard coat layer was roughened by pressing to the convexoconcave surface of the following convexoconcave roller. The residual solvent content of the web was 120% by mass.

<Convexoconcave Roller 6>

Convexoconcave roller 6: A roller on the surface of which convexoconcave patterns having a height difference of 2 μm and a pitch of projections of 25 μm was formed by a laser; the shape of cross section of the convexoconcave patterns was FIG. 5(A); the diameter and the width were each 100 mm and 1.4 m, respectively; the material was silicone rubber (as to the shape of the roller, refer to FIG. 4). This roller was used as the roller facing to the convexoconcave roller 5.

[Preparation of Anti-Glare Anti-Reflection Film 13]

An anti-glare anti-reflection film 13 was prepared in the same manner as in the anti-glare anti-reflection film 1 except that the following hard-coat layer coating liquid 2 was coated so as to form a layer having a thickness of 10 μm on the cellulose triacetate film 1.

<Hard-Coat Layer Coating Liquid 2>

The following materials were stirred and mixed to prepare a hard-coat layer coating liquid 2.

| | |
|---|---|
| Acryl monomer Kayarad DPHA (Dipentaerythritol hexaacrylate, Nippon Kayaku Co., Ltd.) | 226 parts by mass |
| Synthesized silica (Average diameter: 4.5 μm) | 40 parts by mass |
| Irgacure 184 (Ciba Specialty Chemicals Inc.) | 25 parts by mass |
| Propyleneglycol monomethyl ether | 101 parts by mass |
| Ethyl acetate | 101 parts by mass |

[Evaluation of Anti-Glare Anti-Reflection Film]

The above obtained anti-glare anti-reflection films 1 to 13 were subjected to the following evaluation. The constitutions and the evaluation results are listed in Table 1.

(Haze)

Haze of one sheet of each of the film samples was measured by a haze meter 1001DP, manufactured by Nippon Denshoku Industries Co., Ltd., according to JIS K-6714.

(Unevenness)

The optical film on which the convexoconcave structure was formed (before the coating of the intermediate refractive index layer coating liquid 1 and the low refractive index layer coating liquid 1) was sampled at the initial stage of production of the optical film and after production of 1,000 m long. The surface of these samples were visually observed and evaluated according to the following criteria.

A: Almost no unevenness was observed on the film surface.
B: Unevenness was slightly observed on the film surface but no problem occurs in practical use.
D: Much unevenness was observed on the film surface.

(Evaluation of Glaring)

Diffused light from a fluorescent lump having a louver was reflected on each of the above prepared film samples and the dazzle was visually evaluated.

A: No glare was observed.
B: Glare was hardly observed.
C: Glare was slightly observed.
D: Glare was clearly observed.

TABLE 1

| Anti-glare anti-reflection film No. | Convexo-concave formation on viewing side | Surface roughness (Ra)a (μm) | Convexo-concave formation on backside | Surface roughness (Ra)b (μm) | Film thickness (μm) | Haze (%) | Unevenness | Glaring | Remarks |
|---|---|---|---|---|---|---|---|---|---|
| 1 | HC layer (**1) | 0.4 | — | — | 50 | 0.7 | D | D | Comp. |
| 2 | HC layer (**1) | 0.4 | **2 | 0.3 | 50 | 0.8 | A | B | Inv. |
| 3 | HC layer (**4) | 0.9 | **3 | 0.5 | 50 | 1.0 | A | B | Inv. |
| 4 | Support (**5) | 0.4 | — | — | 50 | 0.7 | D | D | Comp. |
| 5 | Support (**5) | 0.4 | **6 | 0.2 | 50 | 0.8 | A | A | Inv. |
| 6 | Support (**5) | 0.4 | **6 | 0.2 | 80 | 0.8 | C | D | Comp. |
| 7 | Support (**5) | 0.4 | **6 | 0.2 | 70 | 0.8 | B | C | Inv. |
| 8 | Support (**5) | 0.4 | **6 | 0.2 | 60 | 0.8 | A | B | Inv. |
| 9 | Support (**5) | 0.4 | **6 | 0.2 | 40 | 0.8 | A | A | Inv. |
| 10 | Support (**5) | 0.4 | **6 | 0.2 | 30 | 0.8 | A | B | Inv. |
| 11 | Support (**5) | 0.4 | **6 | 0.2 | 20 | 0.8 | C | B | Inv. |
| 12 | Support (**5) | 0.4 | **6 | 0.2 | 15 | 0.8 | D | C | Comp. |
| 13 | 4.5 μm fine particle-containing HC layer | 0.4 | — | — | 50 | 2.5 | B | C | Comp. |

| Convexo-concave roller No. | Material | Surface roughness, Convexoconcave height difference, Projection pitch | Convexoconcave patterns forming method |
|---|---|---|---|
| 1 | Quartz glass | Surface roughness: 0.5 μm | Sandblasting method |
| 2 | Metal | Height difference: 1.5 μm, projection pitch: 15 μm | laser method |
| 3 | Metal | Height difference: 3 μm, projection pitch: 30 μm | laser method |
| 4 | Quartz glass | Surface roughness: 1.0 μm | Sandblasting method |
| 5 | Metal | Height difference: 3 μm, projection pitch: 10 μm | laser method |
| 6 | Silicone rubber | Height difference: 2 μm, projection pitch: 25 μm | laser method |

HC layer: Hard coat layer,
Support: Cellulose triacetate film
**Convexoconcave roller,
Comp.: Comparative,
Inv.: Inventive As is cleared in Table 1, the anti-glare anti-reflection films 2, 3, 5 and 7 to 12 are clearly superior and the unevenness and glaring are reduced compared with the comparative examples. Particularly, the anti-glare anti-reflection films prepared by providing the hard-coat layer and the anti-reflection layer after the formation of convexoconcave patterns on the both sides of the thermoplastic resin film are superior in the unevenness and glaring.

Example 2

[Preparation of Anti-Glare Anti-Reflection Films 21 to 25]

In the preparation method of anti-glare anti-reflection film 3 of Example 1, the surface roughness (Ra)b of the surface opposite to the surface on which the hard-coat layer was provided was varied as shown in Table 2 by varying the convexoconcave structure of the convexoconcave roller 2 by varying the laser irradiation condition. Thus, anti-glare anti-reflection films 21 to 25 were obtained. The surface roughness of the viewing side (Ra)a was 0.9 μm.

The anti-glare anti-reflection films 21 to 25 were subjected to the same evaluation as in Example 1.

Process 2: The above polarization membrane was immersed for 1 to 2 seconds in a poly(vinyl alcohol) adhesive solution having a solid content of 2% by mass.

Process 3: The adhesive solution excessively adhering on the polarization membrane in Process 2 was lightly removed and the membrane was arranged between the KC8UCR treated by alkali in Process 1 and the optical film having the convexoconcave surface.

Process 4: The piled films and membrane were laminated by a pair of rollers rotating at a rate of about 2 m/min with a pressure of from 20 to 30 N/cm². On such the occasion, the lamination was carefully carried out so that any bubble was not contained in the laminated sample.

Process 5: The sample prepared in Process 4 was dried in a drying machine at 80° C. for 2 minuets to obtain a polarization plate.

The outermost polarization plate of a liquid crystal display available on the market (color liquid crystal display Melisic LCD1525J Type 1529HM, manufactured by NEC Corp.) was carefully peeled and the above prepared polarization plate was pasted so that the surface roughened optical film was

TABLE 2

| Anti-glare anti-reflection film No. | Surface roughness on viewing side (μm) | Surface roughness on back side (μm) | Surface roughness ratio of back side to viewing side | Haze (%) | Unevenness | Glaring | Remarks |
| --- | --- | --- | --- | --- | --- | --- | --- |
| 21 | 0.9 | 0.8 | 8/9 | 1.1 | B | B | Inventive |
| 22 | 0.9 | 0.6 | 2/3 | 1.1 | A | B | Inventive |
| 23 | 0.9 | 0.45 | 1/2 | 1.0 | A | B | Inventive |
| 24 | 0.9 | 0.18 | 1/5 | 1.0 | A | B | Inventive |
| 25 | 0.9 | 0.15 | 1/6 | 1.0 | C | B | Inventive |

It is cleared from Table 2 that the anti-glare anti-reflection films 21 to 25 each having the surface roughness on viewing side $(Ra)_a$ being within the range of from 0.3 to 2.0 μm and the ratio of the surface roughness of the backside $(Ra)_b$ to that on the viewing side being within the range of from 1/5 to 3/4 are superior in the reduced unevenness and glaring.

Example 3

Polarization plates were prepared by using each of the one sheet of the anti-glare anti-reflection films 1, 2 or 5 and one sheet of retardation film Konica Minolta Tac C8UCR-5, manufactured by Konica Minolta Optics Co., Ltd.

(a) Preparation of Polarization Membrane

Long length poly(vinyl alcohol) film having a thickness of about 120 μm was mono-axially stretched for 5 times at 110° C. The stretched film was immersed for 60 seconds in an aqueous solution composed of a ratio of 0.075 g of iodine, 5 g of potassium iodide and 100 g of water and then further immersed in an aqueous solution composed of a ratio of 6 g of potassium iodide, 7.5 g of boric acid and 100 g of water. The film was washed by water and dried to prepare a long length polarization membrane.

(b) Preparation of Polarizing Plate

After that, a polarization plate was prepared by pasting the polarization membrane with a polarization plate protection film according to the following processes 1 to 5 to prepare a polarization plate.

Process 1: KC8UCR was immersed in a 2 mol/L aqueous solution of sodium hydroxide for 90 seconds at 60° C. and then washed and dried. Besides, peelable protection film made from PET was pasted on the anti-reflection layer side of the optical film for protecting the surface.

faced to outside and the polarization axis was agreed with that of the original polarization plate to prepare an image display.

As a result of evaluation, it was cleared that the image displays each using the surface roughened optical film 2 and 5 were superior in the anti-glare ability and the visivility, tone and displaying ability were alike good compared to the display using the comparative anti-glare anti-reflection film 1.

Example 4

Anti-glare anti-reflection films 2' and 5' were each prepared in the same manner as in anti-glare anti-reflection film 2 and 5 in Example 1, respectively, except that the surface of the hard-coat layer was subjected to the following atmosphere pressure plasma discharging treatment before the coating of the intermediate refractive layer and the low refractive layer.

(Atmosphere Pressure Plasma Discharging Treatment)

Figure 8:
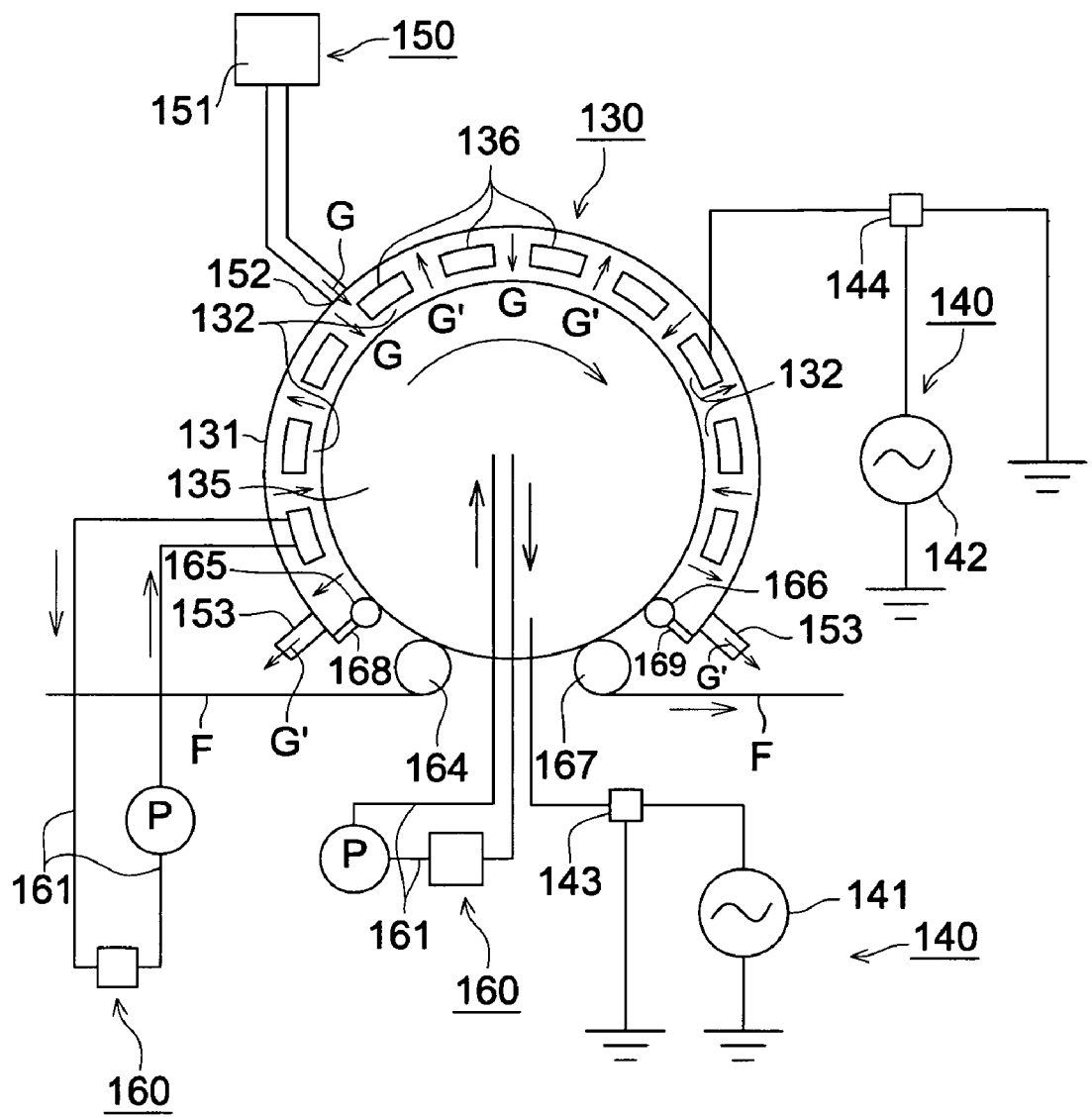
FIG. 8 shows an atmosphere pressure plasma discharging apparatus usable in the invention.

An atmosphere pressure plasma discharging treatment was applied on the hard-coat layer 1 using the atmosphere pressure plasma discharging apparatus show in FIG. 8 in which the space between the two electrodes was set at 1 mm and the following gas was supplied into the discharging space. The plasma discharge was carried out by applying a high frequency electric field of 10 kV/mm with an output density of 1 W/cm² to the first electrode using a high frequency power source (50 kHz), manufactured by Shinko Electric Co., Ltd., as the first power source, and a high frequency electric field of 0.8 kV/mm with an output density of 5.0 W/cm² to the second electrode using a high frequency power source (13.56 kHz), manufactured by Pearl Kogyo Co., Ltd., as the second power source. On this occasion, the electric field in nitrogen gas in the discharging space was 3.7 kV/mm at the time of beginning of discharge. The roller electrode was rotated by a driver synchronously with the transfer of the film having the hard-coat layer. The temperature of both electrodes was controlled for keeping at 80° C.

<Gas Composition TA>

Discharging gas: Nitrogen 100.0% by volume

The anti-glare anti-reflection films 2' and 5' were compared with the anti-glare anti-reflection films 2 and 5 by evaluating layer adhesion additionally to the above evaluations of the haze, unevenness and glaring. As a result of that, the layer adhesion of the anti-glare anti-reflection films 2' and 5' was ranked as C, in contrast that of the anti-glare anti-reflection films 2 and 5 were ranked as C. It was confirmed that the anti-glare anti-reflection films improved in the layer adhesion can be obtained additionally to the effects of the present invention.

(Evaluation of Layer Adhesion)

Eleven cut lines at interval of 1 mm and the same number of lines crossing at a right angle with together were made on the surface of the anti-glare anti-reflection film by a razor blade so as to form a lattice composed of one hundred squares of 1 mm. Cellophane tape, manufactured by Nichiban Co., Ltd., was put on the lattice and strongly peeled off by holding one end of the tape. The ratio of the area in the 100 squares of the lattice where the anti-reflection layer was peeled was visually observed and evaluated according to the following ranks.

Peeled Area

A: The layer was not peeled at all.
B: The ratio of peeled area was less than 20%.
C: The ratio of peeled area was 20% or more.

What is claimed is:

1. A method of manufacturing an anti-glare anti-reflection film comprising the steps of:
    providing a hard coat layer on a first surface of a thermoplastic resin film; and
    providing an anti-reflection layer on the hard coat layer, wherein
    the method further comprises, the steps of:
        providing a first convexoconcave structure which gives an anti-glare property on the first surface of the thermoplastic resin film or on the hard coat layer provided on the first surface, before providing the anti-reflection layer on the hard coat layer; and
        providing a second convexoconcave structure which gives the anti-glare property on the second surface of the thermoplastic resin film or on a layer provided on the second surface, the second surface being a surface of the thermoplastic resin film opposite to the first surface, wherein
    an average total thickness of the anti-glare anti-reflection film is 20 to 70 μm.

2. The method of claim 1, wherein
the step providing the first convexoconcave structure and the step providing the second convexoconcave structure are each carried out by embossing with a roller having a convexoconcave structure.

3. The method of claim 1, wherein
the hard coat layer and the anti-reflection layer are provided on the first surface of the thermoplastic resin film; and
the step of providing the first convexoconcave structure is carried out before the step of providing the hard coat layer.

4. The method of claim 1, wherein
the hard coat layer and the anti-reflection layer are provided on the first surface of the thermoplastic resin film; and
the step of providing the first convexoconcave structure is carried out between the step of providing the hard coat layer and the step of providing the anti-reflection layer on the hard coat layer.

5. The method of claim 2, wherein
a convexoconcave structure of a convexoconcave roller used to provide the first convexoconcave structure is formed by using a metallic material or a ceramic material; and
a convexoconcave structure of a convexoconcave roller used to provide the second convexoconcave structure is formed by using a rubber material.

6. The method of claim 2, wherein
a convexoconcave structure of a convexoconcave roller used to provide the first convexoconcave structure is formed by using a rubber material; and
a convexoconcave structure of a convexoconcave roller used to provide the second convexoconcave structure is formed by using a metallic material or a ceramic material.

* * * * *